United States Patent
Fischer

(10) Patent No.: US 6,664,833 B1
(45) Date of Patent: Dec. 16, 2003

(54) DUAL-EDGE FUNCTION CLOCK GENERATOR AND METHOD OF DERIVING CLOCKING SIGNALS FOR EXECUTING REDUCED INSTRUCTION SEQUENCES IN A RE-PROGRAMMABLE I/O INTERFACE

(75) Inventor: Michael A. Fischer, San Antonio, TX (US)

(73) Assignee: Intersil Americas, Inc., Irvine, CA (US)

( * ) Notice: Subject to any disclaimer, the term of this patent is extended or adjusted under 35 U.S.C. 154(b) by 475 days.

(21) Appl. No.: 09/717,459

(22) Filed: Nov. 20, 2000

(51) Int. Cl.⁷ ................................................ H03K 5/12
(52) U.S. Cl. ...................................... 327/170; 327/172
(58) Field of Search ................................ 327/105, 122, 327/113, 170, 172

(56) References Cited

U.S. PATENT DOCUMENTS

| | | | |
|---|---|---|---|
| 4,692,932 A | * | 9/1987 | Denhez et al. .............. 375/107 |
| 4,843,331 A | * | 6/1989 | Yang .......................... 327/122 |
| 5,799,186 A | | 8/1998 | Compton ........................ 713/2 |
| 5,809,291 A | | 9/1998 | Munoz-Bustamante et al. |
| 5,884,068 A | | 3/1999 | Conary et al. .............. 713/501 |
| 5,923,621 A | | 7/1999 | Kanekal et al. ............. 368/117 |
| 6,091,270 A | | 7/2000 | Cauchy ....................... 713/501 |

* cited by examiner

*Primary Examiner*—Dinh T. Le
(74) *Attorney, Agent, or Firm*—DeMont & Breyer, LLC

(57) ABSTRACT

A function clock signal used to clock the execution of instructions in a serial peripheral interface based on a source clock signal is generated to have characteristics of one cycle per bit signal transmitted or received by the interface. The function clock signal is created by logically gating the source clock signal and a delayed copy of the source clock signal to create the function clock signal. The delayed copy of the source clock signal responds to edges of the function clock signal created by the logical gating, to create the function clock signal. In addition, the frequency of the function clock signal may be forced equal to the frequency of the source clock signal, which is useful to execute a single instruction for a repeated number of times. A rising edge of the function clock signal may also be made coincident to a rising edge of the source clock signal under such equal frequency circumstances.

17 Claims, 16 Drawing Sheets

| | | 592 | | | | 594 | |
|---|---|---|---|---|---|---|---|
| INSTRUCTION | 7 | 6 | 5 | 4 | 3 | 2 | 1 | 0 |
| WAIT | 0 | 0 | 0 | 1 | 0 | 0 | EVENT | |

| | | | | | 602 | 604 | | |
|---|---|---|---|---|---|---|---|---|
| INSTRUCTION | 7 | 6 | 5 | 4 | 3 | 2 | 1 | 0 |
| OUTnxb | 0 | 0 | 1 | 1 | 0(OUT) | COUNT (C) | | |
| INbnx | 0 | 0 | 1 | 1 | 1(IN) | COUNT (C) | | |

| | |
|---|---|
| 0 | RESERVED* |
| 1 | OUT/IN, SKIP ALT |
| 2 | OUT/IN 2 CYCLES, SKIP ALT |
| 3 | OUT/IN 3 CYCLES, SKIP ALT |
| 4 | OUT/IN 4 CYCLES, SKIP ALT |
| 5 | OUT/IN 5 CYCLES, SKIP ALT |
| 6 | OUT/IN 6 CYCLES, SKIP ALT |
| 7 | OUT/IN 7 CYCLES, SKIP ALT |

DUAL-EDGE FUNCTION CLOCK GENERATOR AND METHOD OF DERIVING CLOCKING SIGNALS FOR EXECUTING REDUCED INSTRUCTION SEQUENCES IN A RE-PROGRAMMABLE I/O INTERFACE

CROSS-REFERENCE TO RELATED INVENTION

This invention is related to an invention for a "Sequencer and Method of Selectively Inhibiting Clock Signals to Execute Reduced Instruction Sequences in a Re-Programmable I/O Interface," described in U.S. application Ser. No. (SE-1589/213.302), filed concurrently herewith by the present inventor and assigned to the assignee hereof. The disclosure of this concurrently filed application is incorporated herein by this reference.

FIELD OF THE INVENTION

This invention relates to input/output (I/O) interfaces used for connecting relatively complex and high capacity computer systems to peripheral equipment. More particularly, the present invention relates to a new and improved I/O interface by which to send and receive communication signals, preferably in a serial or narrow parallel form, which offers the advantage of relatively small size, relatively high performance, relatively low power consumption, and comparatively great versatility and flexibility in accommodating and executing a variety of different complex communication protocols.

BACKGROUND OF THE INVENTION

Many modern electronic devices are built as an entire system on a single semiconductor chip, and as such, are known as system on a chip (SoC) integrated circuits or application specific standard products (ASSPs). Building an entire system or large portion of the system on a single chip has a number of advantages. Although the costs of initially designing and fabricating the component may be relatively high, it is very inexpensive to replicate large numbers of the systems, thereby reducing the cost of the system on a per unit basis. By designing the entire system or large portion of the system on a single chip, a high level of functionality and better functional interaction between the components of the system usually results in a more reliable and better functioning product. Usually the entire system or large portion of the system may be fabricated and packaged in an electronic component which is physically very small, making such SoCs and ASSPs ideal for use in small and portable devices which require a relatively high level of functionality, such as portable telephones.

Disadvantages of such entire system SoCs and ASSPs is that they are usually specifically designed to have a single, fixed function. With the continuing evolution of improvements in electronic devices, a fixed function system on a chip is likely to have a relatively short usable lifetime before its functionality becomes outmoded due to the progress of improvements and changes in technology. Very few, if any, improvements may be accommodated in a fixed function chip because it has been specifically designed to implement only a single set of functionality. Its fixed functionality usually does not anticipate future improvements because such future improvements are generally not predictable. In order to implement improvements in such systems, it is necessary to redesign the entire semiconductor chip, which again introduces the relatively high costs of designing and preparing for fabrication of the system on a semiconductor chip.

Attempts at making systems on a chip more flexible in terms of accommodating more than a single fixed functionality have been made, but such attempts involve many complexities. Attempting to determine exactly the mix of the different components needed on such a chip, such as a processor core, memory, logic gates and peripheral interface devices is very difficult to predict because different devices require different quantities of these components and functionality from these components. Efforts to provide great flexibility in terms of quantity and capabilities generally translates into building more of these components to have reserve quantity and excess functionality available. Increasing the number of components on the chip may not be possible, because of the limited size of the chip upon which to form these components. Increasing the number of components on a chip also increases the cost of fabricating the chip.

These considerations are particularly relevant to input/output (I/O) interfaces which are included on such SoCs and ASSPs with increasing regularity. Traditional hard-wired, I/O interfaces are subject to the restrictions of fixed functionality and limited flexibility to accommodate future improvements.

An increasingly popular alternative which provides maximum flexibility is an I/O interface which communicates the signals directly to a register, and an embedded controller connected to that register which executes firmware in accordance with the communication protocol. New or different functionality may be achieved by loading new firmware onto the embedded controller. The disadvantage of this approach is that the clocking rates must generally be many times the rate of the input/output signals, for example a factor of 8 to 32 times greater. With the increases in modern signal communication rates, the internal clock rates necessary to implement this functionality become impractical to achieve, in many circumstances. Moreover in those devices which are portable and operate from self-contained limited power sources such as batteries, the fact that in most modern logic families power consumption increases directly in proportion to the clock rate, the need to use higher clock rates reduces the time for using such devices between recharging. Many devices such as portable telephones and wireless data network adapters depend on having a relatively long usable lifetime between recharging cycles.

Another approach to flexibility is to use programmable logic in the form of field programmable gate arrays (FPGAs). The logic of such FPGAs is programmed as a result of loading a particular control pattern into the chip after it is fabricated. Changing the control pattern permits changing the functionality of the device. The disadvantage of this FPGA approach is that it tends to be significantly less cost-effective, especially for ASSPs and other high-volume production items. Moreover, to insure enough functionality from an FPGA, the number of logic components are typically greater than is actually necessary, typically by a factor of 10 sometimes by as much as a factor of up to 100. Therefore an FPGA will usually consume more space on the SoC than is necessary. Furthermore, it is often difficult to mix FPGAs and blocks of hard wired logic or processor cores on the same chip. FPGAs may offer some benefits, the approach is generally not an ideal solution for all I/O interfaces, nor for power-limited applications.

In all of these cases, the primary nature of a typical I/O interface is a multiplexed serial interface that is either a single data signal or a small number of parallel data signals, which carry larger amounts of data in time sequence. The small number of data signals are often used along with a data transfer clock signal and 1 to 3 other discrete logic signals to perform ancillary functions such as device selection or data direction control. Coding information accompanies these signals and provides control to indicate how the recipient should interpret the received signals. The protocol or rules which govern this sequential transfer may be defined by the behavior of an extended finite state machine. The behavior of a finite state machine can be transformed into a set of logic equations which implement an instance of the communication protocol. The functionality of the state machine depends upon executing commands which set up the various functional states involved in I/O communication. Because of the ability to emulate finite state machines with an embedded processor, it is common to implement I/O protocol control using using firmware on the embedded processor.

Interfaces of this nature are widely used in a variety of applications. For example, the interface may be part of a system chip used in a wireless telephone communication transceiver, in which the system chip acts as both a receiver for incoming signals and a source of outgoing signals to be broadcast. Other examples of similar applications of interfaces are at the opposite ends of a communication link in disk drives, tape drives, wide area networks and local area networks.

In addition, there are a large number of short haul serial buses which are used for communicating signals between separate integrated circuit chips in an electronic device. One type is used in conjunction with external exposed bus, an example of which is the well-known universal serial bus (USB) which is used primarily for connecting a keyboard, mouse and other peripherals to a personal computers. There are many other type of short haul serial bus is used primarily for interconnecting chips within an electronic device. If the signaling between chips can proceed at an acceptable speed, it is an advantage to serialize the signals and send them over a small number of conductors. Reducing the number of conductors to connect signals between the chips saves money and reduces the size of the components, because less package pins are used and fewer solder joints and inter-chip conductors have to be fabricated.

Communication transceiver and protocol controller chips are an examples of electronic devices which commonly use one or more of these short haul serial bus for communicating between the internal, embedded controller and both on-chip and external devices. These types of transceiver and controller chips include interfaces which typically implement a single one out of several common short haul serial bus protocols such as Motorola's Serial Peripheral Interface (SPI), National Semiconductor's MicroWire, Philips Semiconductor's Inter-IC ($I^2C$) bus, and other similar vendor proprietary protocols. However, one disadvantage has been that the interface on such chips has been hard wired, thereby preventing it from being reprogrammed to use a different type of short haul serial bus protocol. The user of such a controller chip is simply limited to using the type of bus protocol which had been hard wired into the controller chip or else additional logic chips were required to translate between bus protocols, with a result of increased cost, size, and power consumption. Therefore, the external devices which communicated with the controller had the use the same type of serial bus protocol as had been hard wired into the controller chip. In many cases, this was a particular disadvantage because the other components of the electronic device may have been designed to implement a different type of protocol, or it may have been an advantage to use a different type of serial peripheral protocol with the external devices.

These and other considerations have given rise to the present invention.

SUMMARY OF THE INVENTION

The present invention has resulted, in significant part, from the discovery and recognition that a very substantial amount of I/O signal processing can be performed with a serial interface using a small set of relatively powerful, special purposse instructions and a reduced frequency of the clock used to execute those instructions. No more than two instructions need be executed for each time period during which bit signals are communicated to or from the interface. Many instructions provide the ability to perform multiple functions simultaneously, and the opportunity to execute two of these instructions during each time period of bit signal transmission and reception permits the opportunity to set up the necessary functionality in the interface for the transmission and/or reception of the bit signals and ancillary clock and control signals as may be necessary.

Of course, executing the instructions at reduced clock frequency reduces the amount of power consumed, because the power consumption is directly related to the clock frequency. Reducing the size and number of the instructions has the effect of reducing the size of the modules required to implement the interface, thereby facilitating its integration into a system on a chip or other ASSPs. The implementation of the interface is also directly enhanced by using digital logic circuit elements which minimize or avoid extra time clocks and time delays, while still minimizing the size of the interface.

The present invention also recognizes and resolves the issue of making short haul serial peripheral interfaces reprogrammable. Being re-programmable, each interface may be changed in functionality to implement different serial bus protocols by simply loading new instructions required for the protocols. Reprogrammability permits a range of generalities to be implemented in a system chip with an embedded processor, because the interface can be reprogrammed to implement any of the inter-chip serial bus protocols without restricting the bus protocol to a single hard wired implementation. Thus the previous restriction of using controllers and other system chips with only a single serial peripheral bus protocol is eliminated, which offers the advantage of allowing the user to select the most effective bus communication protocol for the elements within and exterior of the system chip. Avoiding this restriction permits the same system chip to execute different re-programmable firmware to support a variety of different serial bus protocols, allowing the functionality of the system chip to be updated with advancements in communication protocols.

These and other improvements are achieved in a function clock generator for generating a function clock signal used to clock the execution of instructions by an instruction decoder in a serial peripheral interface based on a source clock signal having one cycle per bit signal transmitted or received by the interface. The function clock generator comprises a logic gate circuit connected to receive the source clock signal and a delayed copy of the source clock signal. The logic gate circuit logically gates the source clock signal with a delayed copy of the source clock signal to create the function clock signal. A delay circuit receives the function clock signal and is responsive to edges of the function clock signal gated by the logic gate circuit to create the delayed copy of the source clock signal.

Other preferable aspects of the improvements involve the logic gate circuit gating one cycle of the function clock signal for each rising and falling edge of the source clock signal, making the frequency of the function clock signal twice the frequency of the source clock signal, time delaying the copy of the source clock signal through the through the delay circuit, implementing the logic gate circuit as XOR logic functionality by a plurality of NAND gates, and inverting the delayed copy of the source clock signal prior to applying the delayed copy of the source clock signal to the logic gate circuit. Preferably the time delay circuit includes a flip-flop, a delay element and an inverter connected in series and a feedback path from the inverter to the flip-flop to supply the signal from the inverter to the flip-flop in a feedback configuration, and the time delayed copy of the source clock signal is derived from an output signal from the inverter in the feedback path and the flip-flop is clocked to change states upon each rising edge of the function clock signal.

Other preferable aspects involve the function clock generator being responsive to an alternate inhibit signal in which they selective inverting logic gate is connected to receive the delayed copy of the source clock signal from the inverter of the delay circuit and to receive the alternate inhibit signal. The selective inverting logic gate supplies an inverted copy of the source clock signal from the delay circuit upon the assertion of the alternate inhibit signal, and the logic gate circuit responds to the source clock signal and the inverted copy of the source clock signal to transition edges of the function clock signal coincidentally with edges of the source clock signal. The transition of edges of the function clock signal occurs coincidentally with edges of the source clock signal so long as the alternate inhibit signal is asserted. The function clock generator may also be responsive to a rising edge primary signal to cause rising edges of both the function clock signal and the source clock signal upon the assertion of the alternate inhibit signal and the rising edge primary signal.

Other improved aspects of the present invention relate to a method for generating a function clock signal used to clock the execution of instructions in a serial peripheral interface based on a source clock signal having one cycle per bit signal transmitted or received by the interface. The method involves logically gating the source clock signal and a delayed copy of the source clock signal to create the function clock signal, and creating the delayed copy of the source clock signal used in response to edges of the function clock signal created by the logical gating. Many of the preferred functional aspects of this method have been described above in connection with the function clock generator.

A more complete appreciation of the present invention and its scope may be obtained from the accompanying drawings, which are briefly summarized below, from the following detailed description of a presently preferred embodiment of the invention, and from the appended claims.

BRIEF DESCRIPTION OF THE DRAWINGS

FIG. 13 is a graphical illustration of the bit fields of a wait instruction recorded in an instruction store of the reprogrammable interface shown in FIG. 3.

FIG. 14 is a graphical illustration of the bit fields of an OUTnxb and an INbnx instruction recorded in an instruction store of the reprogrammable interface shown in FIG. 3.

DETAILED DESCRIPTION

Figure 1:
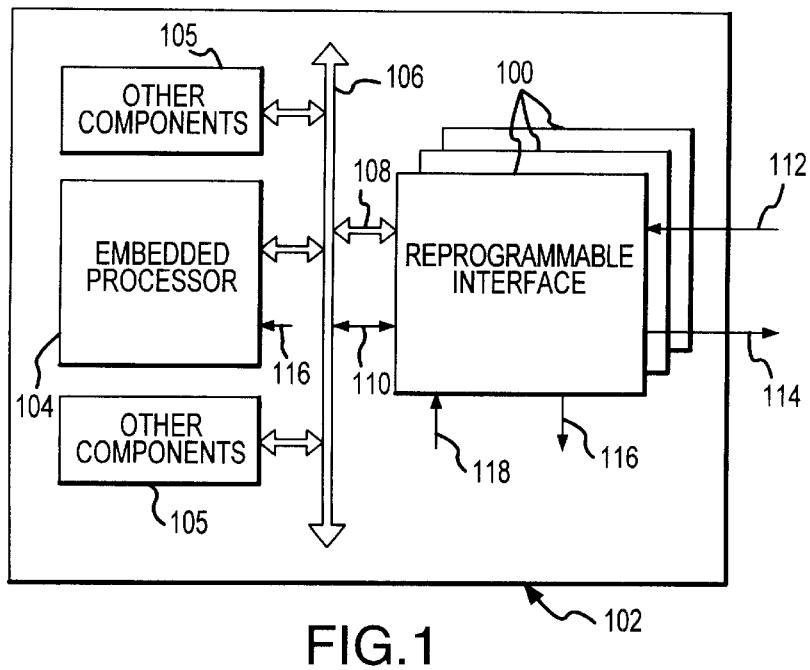
FIG. 1 is a block diagram of a reprogrammable interface which embodies the present invention shown as a part of a system on a chip which includes an embedded processor.

A reprogrammable interface 100, in which the present invention is embodied, is preferably a part of a larger system on a chip or system chip 102, such as an ASSP, as shown in FIG. 1. In addition to the reprogrammable interface 100, the system chip 102 includes an embedded controller or processor 104 and other components 105, such as memory, which are specific to the system chip 102. Preferably, the system chip 102 will also include one or more of the reprogrammable interfaces 100. An internal bus 106 connects each reprogrammable interface 100, the embedded processor 104 and the other on-chip modules 105 together, by which signals are communicated between these elements. The reprogrammable functionality of the interface 100 is achieved as a result of the processor 104 loading different sets of code or values which define instructions into the interface 100. The code or instructions are loaded into the interface 100 over data lines 108 which extend from the internal bus 106. Control and status signals are also supplied to the interface 100 from the processor 104 over control and status lines 110 which also extend from the bus 106. The instructions loaded over the data lines 108, and the control and status signals loaded over the lines 110, allow the interface 100 to be reprogrammed to obtain different types of functionality. After a given set of instructions are loaded into the interface 100, they are retained in a local instruction store, where they may be invoked under command of the processor 104 until such time as the interface 104 instructions are reloaded or the chip is reset.

The primary functionality of the reprogrammable interface 100 is to act as an input/output (I/O) interface for receiving externally-generated signals 112, which are applied as input signals to the system chip 102, and for supplying internally-generated signals 114, which are supplied as output signals by the system chip 102. In this regard, the interface 100, the processor 104 and other components of the system chip 102 act as either a transmitter or a receiver or both in a communication system with a complementary receiver and transmitter at the other end of the communication link. For serial bus protocols that involve master-slave operation, the interface 100 may be programmed to function as either the master or the slave.

In addition to communicating the input signals 112 and the output signals 114, the interface 100 also supplies internal condition and event signals 116 to the embedded processor 104 and other on-chip modules 105 of the system chip 102. The interface 100 also receives control strobe signals 118 from the embedded processor 104, and possibly from other on-chip modules 105 of the system chip. The condition and event signals 116 and the control strobe signals 118 are internal signals which are used to communicate between the chip 102.

In many communication systems, the nature of the signals communicated are a sequence of single digital logic bits. The sequence of serial bit signals carry larger amounts of data in time sequence, as well as convey timing, control and status information along with the data signals themselves. The signals are organized and coded for transmission and reception in accordance with preestablished rules, known as a protocol, which define the basis for the communication between the devices at opposite ends of a communication link.

Figure 2:
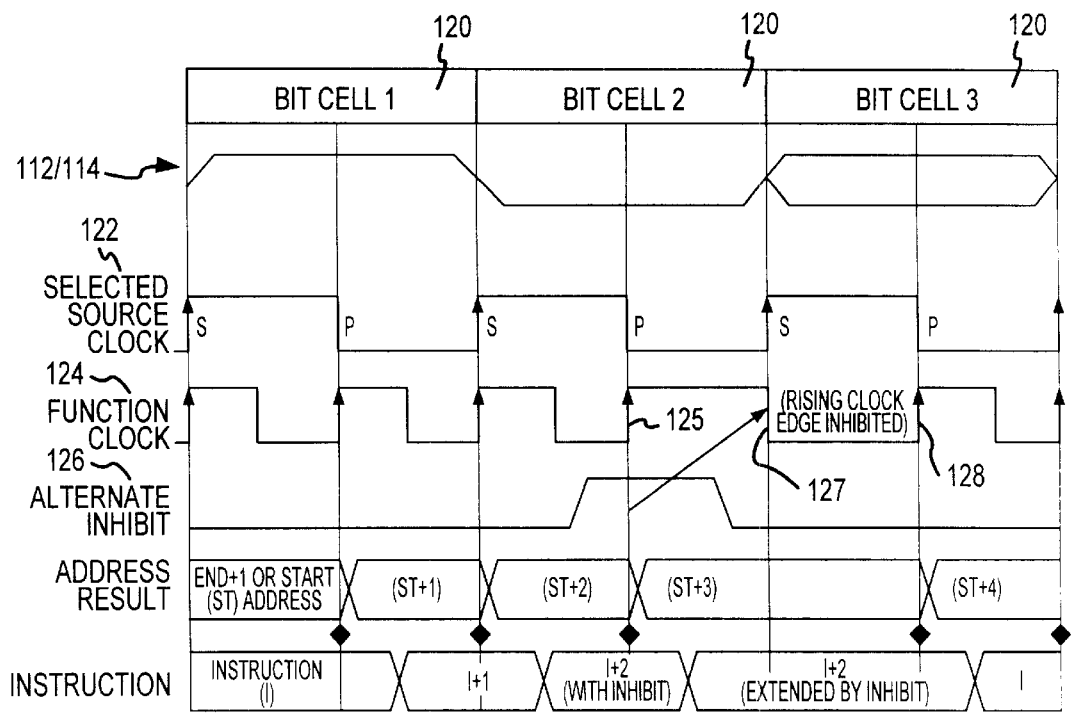
FIG. 2 is a collection of waveform diagrams of signals which are coordinated in time relationship to one another and which illustrate basic functional aspects of the reprogrammable interface shown in FIG. 1.

The interface 100 communicates the input and output signals 112 and 114 as a sequence of the digital logic bit signals, with one digital logic bit signal occurring during a time interval or time period designated as a bit cell 120 shown in FIG. 2. Three sequential bit cells 120 are shown in FIG. 2. Each bit cell 120 is defined by a uniform amount or division of time which is established by the communication frequency at which the bit signals are received and transmitted as the input signals 112 and the output signals 114, respectively. Narrow parallel interfaces operate in a similar manner except that they transfer several bits on separate signal paths during each bit cell.

Each bit signal of the input and output signals 112 and 114 assumes a high digital logic value (or level) or a low digital logic value (or level) during each bit cell 120 when one of the input or output signals 112 or 114 is present. This is illustrated in FIG. 2 where the bit signal occurring during the first bit cell 120 is a high digital logic value and the bit signal occurring during the second bit cell 120 is a low digital logic value. The digital logic values of the bit signals occurring during each bit cell 120 may be either a logic high or a logic low value as represented by both levels of bit signals as shown in the third bit cell. The relationship between logic levels (high or low) on the serial data signals 112, 114 and the data values communicated by those levels (0 or 1) is arbitrary, and is defined as part of the serial bus protocol.

In order to synchronize the operation of the programmable interface 100 to receive input signals 112 or to deliver output signals 114, a source clock signal 122 is present in the interface 100. The source clock signal 122 may be selected from different clock sources, both internal and external to the interface 100, and is therefore referred to as the selected source clock signal. The selected source clock signal 122 defines the boundaries of each bit cell 120. The selected source clock signal 122 undergoes a complete cycle during the duration of each bit cell 120. Thus, a positive pulse of the selected source clock signal 122 occurs during approximately half of the interval of the bit cell 120, and a negative pulse of the selected source clock signal 122 occurs during the remaining half of the bit cell 120. Duty cycle variations, typically extending to at least 33/67 percent, can be tolerated when performing common serial protocols, and more extreme clock asymmetry can be accommodated with careful circuit design. Use of the present invention is not dependent upon having a 50 percent duty cycle square wave as the selected source clock signal, unless such a requirement is part of the communication protocol.

A rising edge of the selected source clock signal 122 (represented by an upward pointing arrow shown in FIG. 2) defines the beginning and ending boundaries of each bit cell 120. Of course, only one rising edge of the selected source clock signal 122 occurs for each bit cell 120. In the following description, the selected source clock signal 122 is sometimes abbreviated as "SelClk," and the function clock signal is sometimes abbreviated "FCLK".

One of the important aspects of the present invention is that the reprogrammable interface 100 generates a function clock signal 124. The function clock signal 124 is occasionally referred to in the following description as "FCLK." A rising edge of the function clock signal 124 is used to clock all data path elements enabled by the instruction decoder, as well as to increment to another instruction executed by the interface 100, among other things, as is discussed below in greater detail. The falling edge of the function clock signal 124 is normally not used by the I/O circuitry of the interface.

As a shown in FIG. 2, the function clock signal 124 normally undergoes two complete cycles during each bit cell 120 and during each cycle of the selected source clock signal 122. The interface 100 includes a dual edge function clock generator (240, FIGS. 4 and 5, described in greater detail below) which generates one cycle of the function clock signal 124 for each rising and each falling edge of the selected source clock signal 122. Because there is both a rising edge and a falling edge during each cycle of the selected source clock signal 122, two complete cycles of the function clock signal 124 occur during each bit cell 120 and each cycle of the selected source clock signal 122. Having two complete cycles of the function clock signal 124 available during each bit cell makes it possible for the programmable interface to execute two instructions per bit cell 120. As discussed more completely herein, executing one or two instructions per bit cell 120 makes it possible for the interface 100 to achieve very high efficiency from an execution-instruction standpoint while consuming very low power in performing I/O operations, among other advantages and improvements.

The selected source clock signal 122 is designated as having a primary edge and a secondary edge. In the example illustrated in FIG. 2, falling edges of the selected source clock signal 122 are designated as the primary edges (P), and rising edges of the selected source clock signal 122 are designated as the secondary edges (S). Designating the edges as primary or secondary is primarily relevant when it is necessary to establish or to maintain synchronization of instruction execution relative to the boundaries of the bit cells 120. Either the rising edge or the falling edge may be designated to be as the primary edge under control of the processor 104, with the opposite edge designated as the secondary edge. The secondary edge is therefore the edge of opposite polarity to the primary edge. Since the falling edge is shown in FIG. 2 as the primary edge, the secondary edge is the rising edge.

In addition to primary and secondary edges of the selected source clock 122, the term "alternate" is used to describe the next sequential edge of the selected source clock signal 122 relative to the the edge of the source clock signal 122 which yielded the rising edge of the function clock signal 124 which caused execution of the current instruction. For example, if the current instruction was executed pursuant to a rising edge of the selected source clock signal 122, the alternate edge would be the following falling edge of the selected source clock signal 122.

The concept of alternate inhibit is described below as inhibiting the generation of a function clock pulse on the alternate edge of the selected source clock signal 122. This has the effect of causing the frequency of the function clock signal 124 to become the same as the frequency of the selected source clock signal 122, during the time of the inhibition. After the inhibition is terminated, the frequency of the function clock signal 124 resumes to its normal rate of twice the frequency of the selected source clock signal 122. This effect is also shown in FIG. 2, where an alternate inhibit signal 126 is asserted at a rising edge 125 of the function clock signal. The alternate edge inhibit signal 126 is sometimes referred to herein as the "Altlhn" signal. In response to the assertion of the alternate inhibit signal 126 during the occurrence of a rising edge of the function clock signal 124, the next cycle of the function clock signal 124 assumes the frequency of the selected clock source 122. This is shown in FIG. 2 by a falling edge 127 of the function clock signal 124 occurring during the next rising edge of the selected source clock signal 122, and by the next rising edge 128 of the function clock signal 124 occurring with the next rising edge of the selected source clock signal 122. Thus, between the edges 125 and 128, the frequency of the function clock signal 124 is the same frequency as the selected source clock signal 122.

The assertion of the alternate edge inhibit signal 126 is very useful in the efficient execution of instructions by the interface 100, as is discussed below. The assertion of the alternate edge inhibit signal 126 makes the frequency of the function clock signal 124 equal to the frequency of the selected source clock signal 122, thereby causing the execution of only one instruction per bit cell 120. The repeated execution of only one instruction per bit cell very effectively performs repetitive I/O functions to enhance the data throughput characteristics of the interface 100 while consuming reduced amounts of power, in contrast to prior state machine implementations which otherwise would require many more instructions to be fetched and executed to accomplish the same purpose.

Figure 3:
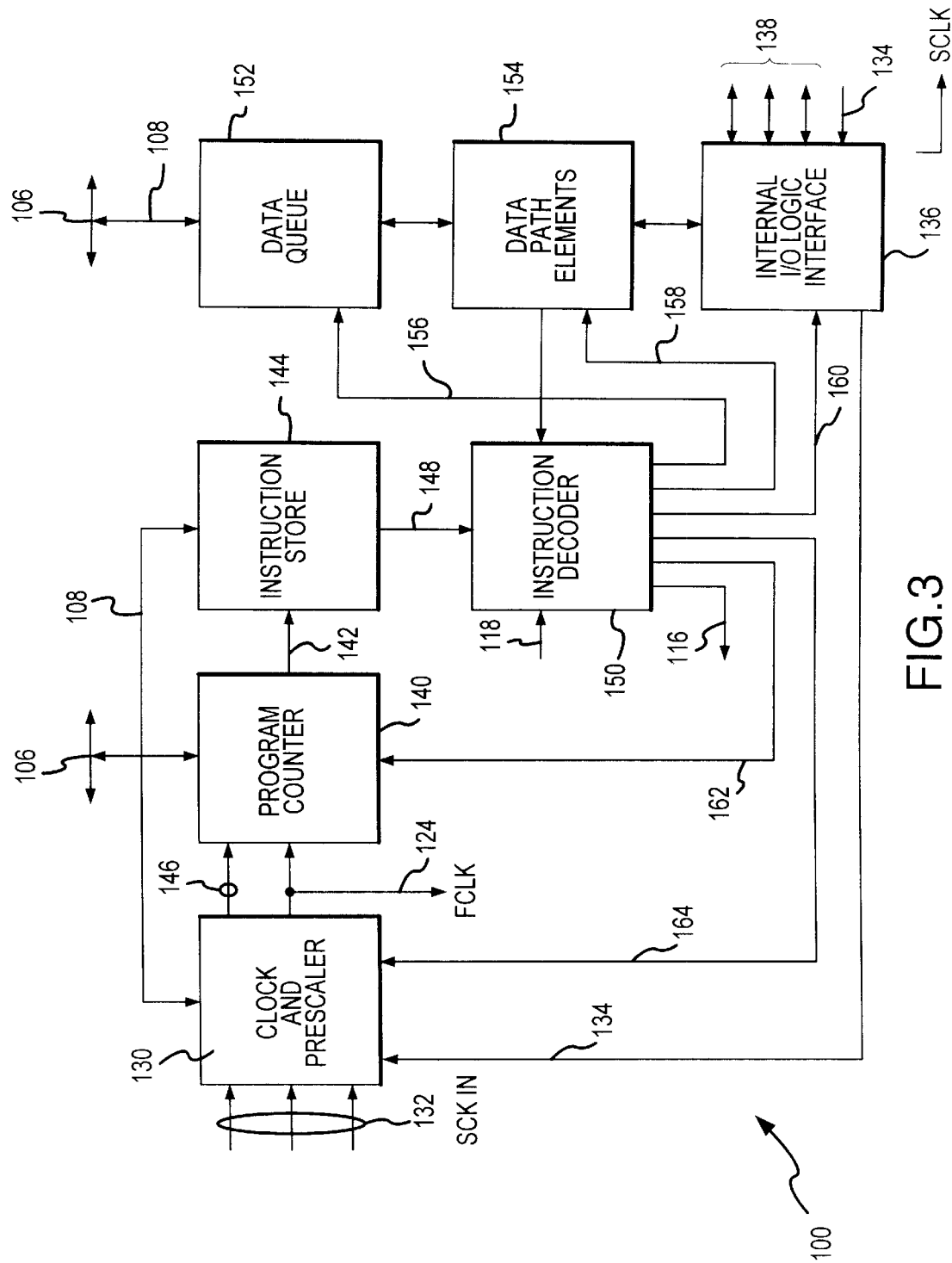
FIG. 3 is a more detailed block diagram of the reprogrammable interface shown in FIG. 1.

More details concerning the reprogrammable interface 100 are shown in FIG. 3. The reprogrammable interface 100 includes a clock and prescaler 130 which generates the function clock signal 124 shown in FIG. 2. The clock and prescaler 130 receives various clock input signals 132 from other sources on the system chip 102, one of which preferably includes the internal clock signal from the processor 104 (FIG. 1). The clock and prescaler 130 also may receive an external serial clock in signal 134 (SCKin) which is supplied by or is derived from an external source which clocks the serial data bits of the input and output signals 112 and 114 (FIG. 1). For example, an external radio receiver or radio transmitter may supply the serial clock in signal 134 to the interface 100. In general, communication receivers provide clock signals, but communication transmitters will often require clock input signals from the interface.

The serial clock input signal (SCKin) 134 is applied from an internal I/O logic interface 136. The internal I/O logic interface 136 communicates data, control and status signals with various components of the system chip 102 (FIG. 1) by I/O signals 138. The I/O signals 138 include at least the input signals 112 and the output signals 114 (FIG. 1). Some serial bus protocols perform full duplex transfers, during which both input 112 and output 114 operate simultaneously. Others use half duplex transfers, performing input and output alternately on a single signal. When half duplex transfers are performed it is sometimes useful to generate a serial data direction (SDDIR) control output in place of the dedicated input 112. Also, many serial bus protocols allow attachment of more than 2 devices in which case a serial device enable (SDE0) signal is typically needed to identify the target devise. The programmable interface 100 can generate one or more SDE-signal although only SDE0 is illustrated herein.

The clock and prescaler 130 produces and distributes the function clock signal (FCLK) 124. The function clock signal 124 clocks or increments a conventional program counter 140, and thereby causes the program counter 140 to supply instruction address signals at 142 to an instruction store 144. The next address value is clocked into the program counter 140 at the rising edge of the function clock signal 124. In addition to the function clock signal 124, the clock and prescaler 130 also produces synchronized control signals 146 to implement run/halt/step logic within the program counter 140. More details concerning the clock and prescaler 130, the function clock signal 124, and the control signal 146 are described below in conjunction with FIGS. 4 and 5.

The program counter 140 is preferably a five to seven bit synchronous counter with parallel load functionality. The program counter 140 can count up and may be able to count down. The program counter 140 can be reset to a start address, or can be commanded to resume at the start address. In addition, the program counter 140 can increment by one for sequential execution, can increment by two for skip functions, and can be loaded with a new value for branch functionality, which may be accomplished conditionally or unconditionally as is well-known.

The instruction store 144 is preferably a conventional small, single port memory array. The instruction store 144 preferably has 32 to 128 locations which hold 8 to 16 bit instructions in each location. The instruction store 144 may be implemented as a small static random access memory (SRAM) array, or as a register file. The code loaded into each memory location constitutes instructions for the reprogrammable interface 100. Instructions are loaded into the memory locations of the instruction store 144 from the internal bus 106 under the control of the embedded processor 104 (FIG. 1). When loading the instructions in the instruction store 144, the embedded processor 104 halts the interface 100 and also sets the program counter 140 to the first location to be loaded. The embedded processor 104 sets the program counter 140 by communicating signals over the internal bus 106 to the program counter. As each instruction is written in a location of the instruction store 146, the embedded processor 104 or bus interface logic increments the program counter 140 to the next location when loading the next instruction.

The instructions addressed by the address signals 142 from the program counter 140 are supplied as instruction signals 148 from the instruction store 144 to an instruction decoder 150. The instruction decoder 150 decodes the instruction signals 148 into various control signals supplied to the other elements of the interface 100. The control signals from the instruction decoder 150 control the operation of the interface 100. The instruction signals 148 are obtained by reading and decoding instructions obtained from the instruction store 144 at the location which is addressed by the address signal 142. One instruction is executed on each rising edge of the function clock signal 124, which corresponds to edges of the selected source clock signal 122 unless the execution is halted by a halt function or completion is extended by executing a delay or wait instruction. Reprogrammability of the interface 100 is obtained as a result of the ability to change the instructions recorded in the instruction store 144.

The reprogrammable interface 100 also includes a data queue 152, which is preferably formed by one or more data registers, and if appropriate, address registers. The address and data registers form a logical transmit queue, a logical receive queue, or both, for the transmission and reception of signals on the internal bus 106. In some implementations, these registers may be organized into a physical first-in, first-out (FIFO) queue. The data queue 152 communicates and synchronizes data flow between the embedded processor 104 (FIG. 1) and the data transmitted to and received by the interface 100.

The data queue 152, the internal I/O logic interface 136 and certain data path elements 154 form an I/O section of the reprogrammable interface 100. The data path elements 154 permit manipulation of the data as applied to or received from the data queue 152, in accordance with instructions received from the instruction decoder 150.

The instruction decoder 150 generates control signals at 156, 158 and 160 which are applied to the data queue 152, the data path elements 154 and the I/O logic interface 136, respectively, to control aspects of their operation. The instruction decoder 150 also supplies control signals 162 and 164 to the program counter 140 and the clock and prescaler 130, respectively, to control their operation. Other control signals are supplied to provide status and I/O event signals 116 to the embedded processor 104 (FIG. 1). The control strobe signals 118, also described in conjunction with FIG. 1, are applied to the instruction decoder 150. More details concerning the I/O section of the interface 100 (data queue 152, I/O logic interface 136 and data path elements 154) are described below in conjunction with FIG. 10.

Figure 4:
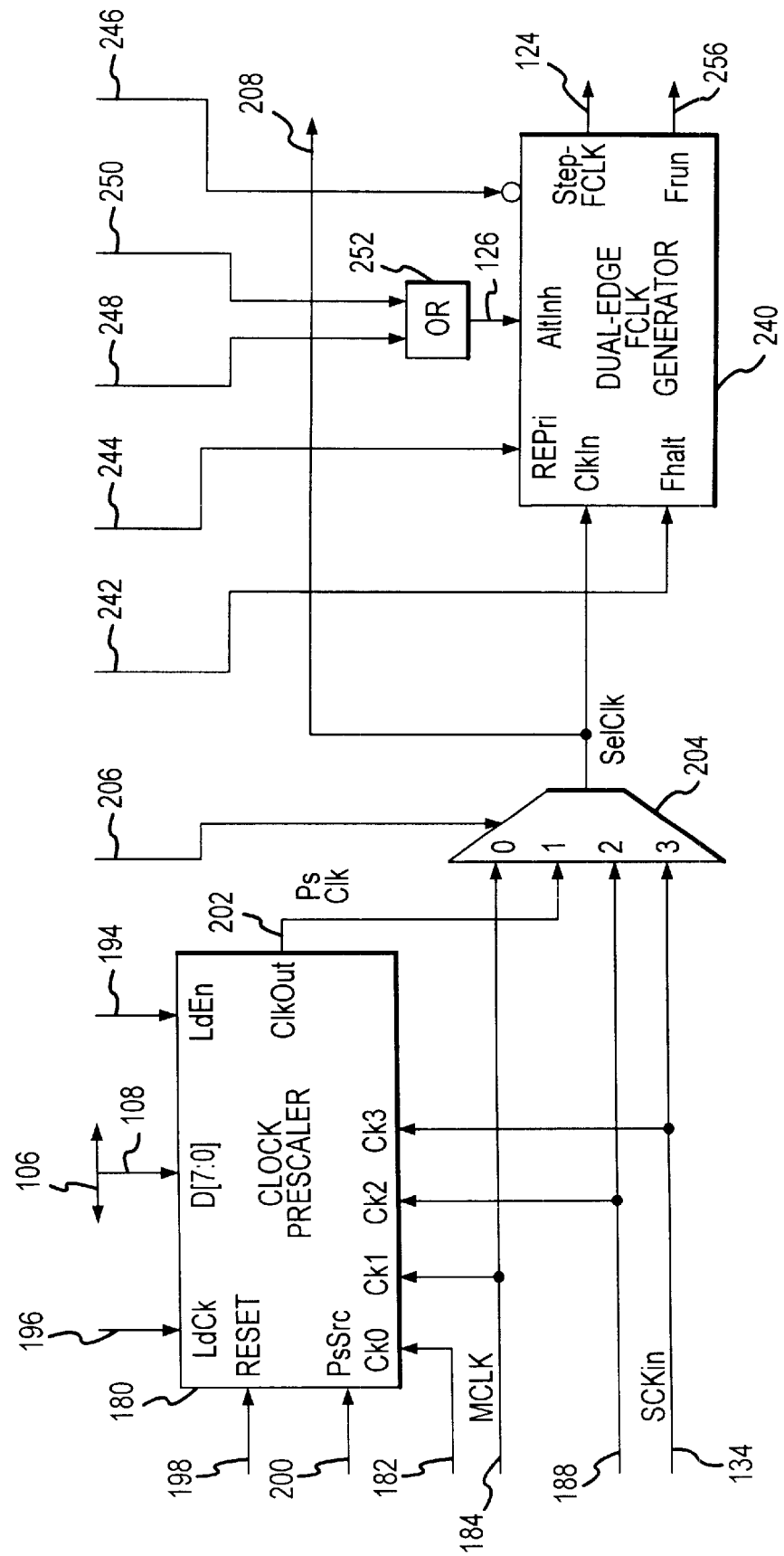
FIG. 4 is a more detailed block diagram of the clock and prescaler block of the reprogrammable interface shown in FIG. 3.

The clock and prescaler 130 is shown in greater detail in FIG. 4. The clock and prescaler 130 typically includes a prescaler 180. The prescaler 180 may be a conventional digital circuit component used to convert a clock signal into a square wave signal having a fifty percent duty cycle. The prescaler 180 derives a lower frequency clock signal from a higher frequency clock signal. The functionality of conventional prescalers is well-known, and a variety of different conventional prescalers may be used as, or as a part of, the clock and prescaler 130.

A variety of different frequency clock signals 134, 182, 184 and 188 are applied to the prescaler 180. Preferably, the clock signal 184 is the master clock signal (MClk) of and from the embedded processor 104 of the system chip 102 (FIG. 1). The clock signal 134 (SCKin) is the external clock signal from an external device (not shown) which is supplied to the interface 100 and conducted through the internal I/O logic 136 (FIG. 3). In certain types of communication systems, an external source such as a receiver or a transmitter will supply a signal which defines the boundaries of the bit cell 120. If a signal from an external prescaler is supplied, that signal is represented at 182. The signal 188 is exemplary of any other different frequency clock signal which may be available for use by the prescaler 180 as a basis by which to derive the selected source clock signal 122.

The prescaler 180 is connected to the internal bus 106 by the data lines 108. Information may be loaded from the embedded processor 104 (FIG. 1) into the prescaler 180 to obtain the frequency selection and square wave characteristics desired, based on a selected one of the clock signals 134, 182, 184 and 188. Control signals 194 to 200 are among the control signals 110 (FIG. 1) which are also applied from the internal bus 106. The control signals 194–200 consist of a prescaler enable signal, load enable signal (LdEn), a load clock signal (LdCk), a reset signal, and a prescaler source select signal 200, respectively.

A prescaler output clock signal (PsClk) 202 is supplied from a clock output terminal of the prescaler 180. The master clock signal 184 is applied to the zero input terminal of the multiplexer 204, the prescaler output clock signal 202 is applied to the first input terminal of the multiplexer 204, and other clock signals 188 and 134 are supplied to the second and third input terminals of the multiplexer 204, respectively. A two bit multiplexer control signal 206, which is one of the control signals 166 supplied from a modal control register loaded by an embedded processor 104 (FIG. 1), selects one of the input terminals to form the clock signal 134. In certain cases the instruction decoder may include the ability to change the signals during instruction execution, but use of such functionality requires considerable care. The clock signal which is selected by the multiplexer 204 becomes the selected source clock signal 122 referred to in FIG. 2. As such, the selected source clock signal defines the bit cells 120 (FIG. 2) which form the basis for the I/O communication through the interface 100. The clock and prescaler 130 may also include a well-known clock qualifier circuit (not shown).

One significant aspect of the present invention is a dual edge function clock generator 240. The dual edge function clock generator 240 receives the selected source clock signal 122. Using the selected source clock signal 122 (FIG. 2), the dual edge function clock generator 240 generates the function clock signal 124 and modifies its frequency in response to the assertion of the alternate inhibit signal (AltInh) 126, as has been mentioned above and as will be discussed in greater detail below in conjunction with FIG. 5. Other signals applied to the function clock generator 240 include a function halt (Fhalt) signal 242, a rising edge primary (REPri) selection signal 244, a step signal 246, an alternate edge inhibit selection signal 248 and a one edge selection signal (1 Edge) 250.

The signals 248 and 250 are combined by an OR gate 252 to create an alternate inhibit signal (AltInh) 126. Either the one edge selection signal 250 or the alternate edge inhibit selection signal 248 cause the same functionality to occur within the function clock generator 240, and for that reason the alternate inhibit signal 126 is the result of applying either of the signals 248 or 250 through the OR gate 252. The assertion of the alternate edge inhibit signal 126 is very useful in executing instructions in accordance with the present invention, as discussed below.

The assertion of the function halt signal 242 ceases the operation of the function clock generator 240, while negating the function halt signal 242 causes the function clock generator 240 to operate. The step signal 246 is used in a conventional manner to generate a single cycles of the function clock signals for stepping through individual logic instructions executed by the interface 100, under control of the embedded processor 104 (FIG. 1) or external debug logic.

The assertion of the rising edge primary signal 244 causes the rising edge of the selected source clock signal 122 (FIG. 1) to become primary as a reference for executing the instructions from the instruction store 144 (FIG. 3). Designating one of the edges of each selected source clock signal as the primary edge has the effect of defining the opposite edge as the secondary edge. Conversely, negating the rising edge primary signal 244 invokes the opposite definition of the rising and falling edges. Primary edges are not necessarily aligned with bit cell boundaries. FIG. 2 shows a falling edge of the selected source clock signal 122 at the beginning of each bit cell 120 as the primary edge, and a rising edge in the middle of each bit cell 120 as the secondary edge. The condition shown in FIG. 2 is achieved by negating the rising edge primary signal 244.

Figure 5:
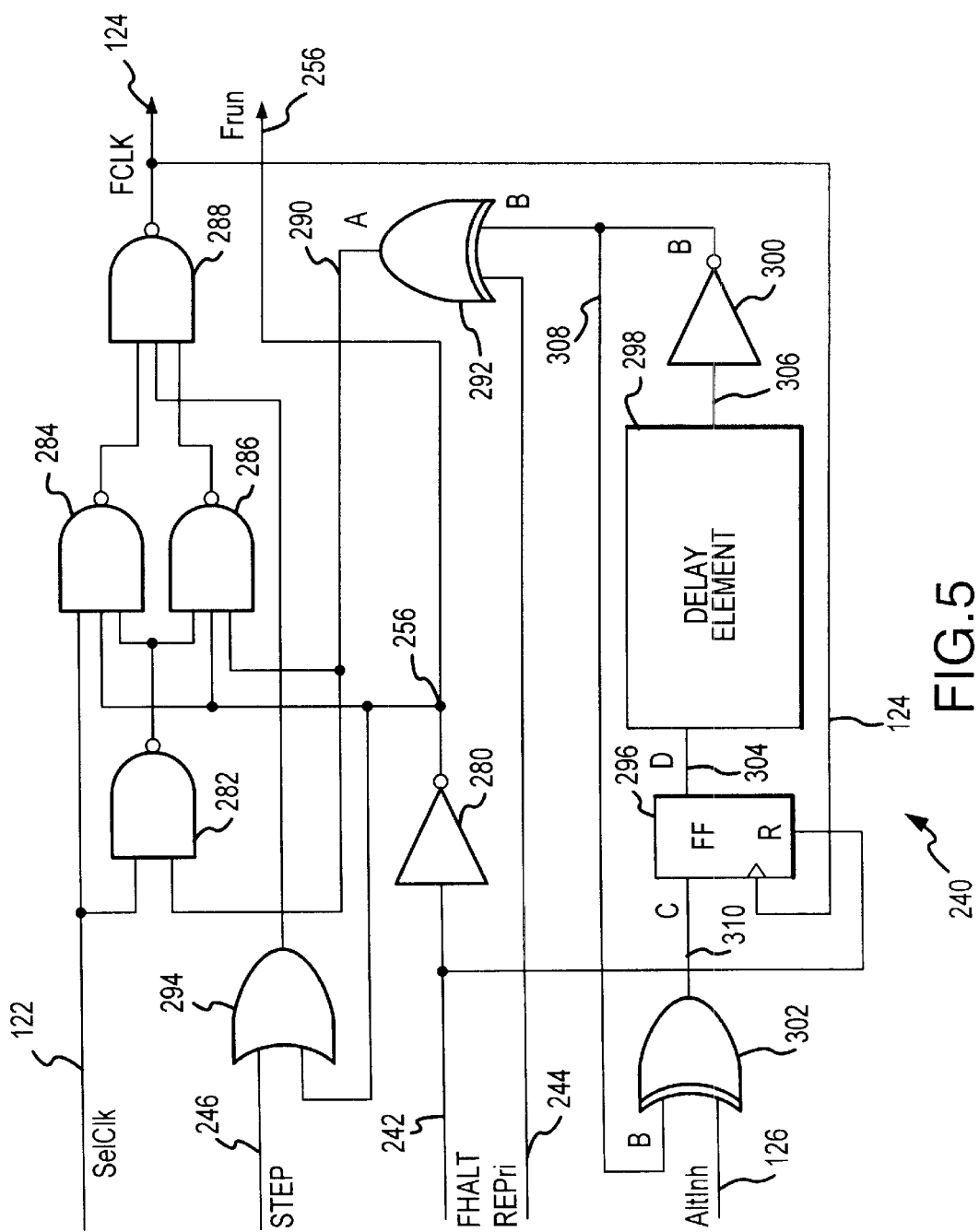
FIG. 5 is a functional logic diagram of the dual edge function clock generator shown in FIG. 4.

A logic diagram of the dual edge function clock generator 240 is shown in FIG. 5. The primary input signals to the function clock generator 240 are the selected source clock signal (SelClk) 122 the rising edge primary signal (REPri) 244, and the alternate inhibit signal (AltInh) 126. The operation of the function clock generator 240 is stopped by the assertion of the function halt signal (Fhalt) the 242. An inverter 280 inverts the logical level of the function halt signal 242 to create a function run (Frun) signal 256. The step signal 246 may be asserted when the function halt signal 242 is asserted to generate single cycle of the function clock signal 124 for the purpose of stepping individually through each of the instructions in the sequence of instructions executed by the interface 100.

The primary functions of the function clock generator 240 are to generate the function clock signal 124 at a frequency which is normally twice the frequency of the selected source clock signal 122 when the alternate inhibit signal 126 is negated; to inhibit or suppress an alternate edge of the selected source clock signal 122 to cause the frequency of the function clock signal 124 to assume the frequency of the selected source clock 122, when the alternate inhibit signal 126 is asserted; and to select the rising edge of the selected source clock signal 122 as the primary edge when the rising edge primary signal 244 is asserted, and to select the falling edge of the selected source clock signal 122 as the primary edge when the rising edge primary signal 244 is negated.

Four NAND gates 282, 284, 286 and 288 are connected to implement EXCLUSIVE OR (XOR) logic functionality between the selected clock source signal 122 and an A signal 290 supplied by an XOR gate 292. As will be apparent from the following discussion, the A signal 290 is a time delayed copy of the selected source clock signal 122. Performing an XOR logic function between the signals 122 and 290 has the effect of multiplying the frequency of the selected source clock (although not preserving symmetry while doing so) thereby causing the function clock signal 124 to have a frequency twice that of the selected source clock signal 122. The lack of symmetry of the function clock signal 124 is not a problem because only rising edges of the function clock signal 124 can use operations within the programmable interface 109.

The A signal is created by a triggering, inverting time delay circuit formed by a flip-flop 296, a delay element 298, an inverter 300, an XOR gate 302, and the XOR gate 292. Using the three-input NAND gates 284 and 286 implements the XOR logic function while permitting the rising edge primary signal 244 and the halt signal 242 to achieve their functionality without the signal propagation delay that would occur if three separate stages of gating were required to implement these functions. This type of logic minimizes the time delay between the selected source clock signal 122 and the function clock signal 124. Excessive delay in this path between signals 122 and 124 could require a compensating delay in the serial data I/O signals, which would have the effect of slowing the functionality of the interface 100.

The function run signal 256 is applied to the input terminals of the NAND gates 284 and 286 to permit the XOR logic functionality to occur while the function clock generator 240 is not halted by the assertion of the function halt signal 242. The function run signal 256 is also applied to one input terminal of an OR gate 294, with the step signal 246 applied to the other input terminal of the OR gate 294. The output signal from the OR gate 294 is applied to one of the input terminals of the NAND gate 288 to allow the step signal 246 to generate a cycle of the function clock signal 124 with each assertion, while the interface 100 is halted.

Another function of the triggering, inverting time and delay circuit formed by the circuit elements 292 and 296–302 is establishing the time width of the positive pulse of each cycle of the function clock signal 124. The XOR logic functionality of the NAND gates 282, 284, 286 and 288 creates a rising edge of the function clock signal 124. The time delay of signal propagation through the delay element 298 is primarily responsible for establishing the time width of the logic high portions of each cycle of the function clock signal. The falling edge of each pulse of the function clock signal 124 is established by the circuit elements 292 and 296–302, as a result of the change in logic state of the A signal 290 at the end of the time period established by the delay element 298. The minimum time width of each pulse must yield a logic high portion of each cycle of the function clock signal 124 which is long enough to clock the relevant circuitry of the reprogrammable interface 100 (FIG. 3). The maximum time width of the logic high portion of each cycle of the function clock signal must be sufficiently shorter than the shortest permissible interval between successive edges of the selected source clock signal 122 to allow clock recovery time.

The flip-flop 296 is clocked by the rising edge of each cycle of the function clock signal 124. Clocking the flip-flop 296 causes a C signal 310 at the input terminal of the flip-flop to be clocked into through the flip-flop 296 to appear as a D signal 304. The D signal 304 from the flip-flop 296 is applied to an input terminal of the delay element 298. Typically, the delay element 298 is formed by a sufficient number of buffers or inverter stages to result in enough signal propagation delay between the input and output terminals of the delay element 298 to satisfy the time width requirements of the high logic portions of each cycle of the function clock signal 124. After a delay caused by the delay element 298, an output signal 306 occurs as a delayed version of the D signal 304. The output signal 306 is inverted by the inverter 300 to become a B signal 308. The B signal 308 is applied to one input terminal of each of the XOR gates 292 and 302. The B signal 308 is a delayed and logically inverted version of the D signal 304.

When the alternate inhibit signal 126 is negated, the XOR gate 302 exhibits logical OR functionality, which allows the B signal 308 to pass through. A high logic level B signal 308 produces a high logic level C signal 310. Of course, a low logic level B signal 308 will produce a low logical level C signal 310. In essence, the time delaying and inverting functionality causes the C signal 310 to alternate in logical levels with each triggering event of the flip-flop 296, when the alternate inhibit signal 126 is negated. Each triggering of the flip-flop is caused by the rising edge of a cycle of the function clock signal 124.

The B signal 308 is propagated through the XOR gate 292 and becomes the A signal 290. The A signal 290 has become inverted as a result of the inverter 300, compared to the logical state of the A signal 290 which initially caused the XOR functionality of the NAND gates 282, 284, 286 and 288 to initiate the rising edge and the positive pulse of the function clock signal 124. Because the A signal 290 has changed states after the time delay caused by the delay element 298, the XOR functionality of the NAND gates 282–288 causes the function clock signal 124 to change logical levels, thereby causing a falling edge of the function clock signal 124 and terminating the time width of the logic high portion of one cycle of the function clock signal.

The logical level of the A signal 290 remains in this state which caused the XOR functionality of the NAND gates 282–288 to terminate the logic high portion of a cycle of the function clock signal 124 until the selected source clock signal 122 changes logical states. When the selected source clock signal 122 changes logical states, XOR functionality of the NAND gates 282–288 again initiates a rising edge and the beginning of a positive pulse of the function clock signal 124. The function clock signal causes the same, previously described effect to occur from the triggering, inverting and delaying circuit formed by the circuit elements 292 and 296–302. In this manner the frequency of the function clock signal 124 is normally twice the frequency of the selected source clock signal 122.

The assertion of the alternate inhibit signal 126 to the input terminal of the XOR gate 302 has the effect of inverting the logical level of the B signal 308 to form the C signal 310. The C signal 310 will not changed states when the next rising edge of the function clock signal 124 occurs, because the inverter 300 and the XOR gate 302 will cause the C signal to maintain its current logic level. By inverting the logical level of the B signal 308 by the inverting action of the XOR gate 302 when the alternate inhibit signal 126 is asserted, the logical level of the C signal does not change relative to the logical level of the previous C signal 310 which initiated the creation of the subsequent B signal. Consequently, when the next rising edge of the function clock signal 124 clocks the flip-flop 196, no change in the logical level of the B signal 308 occurs. The continued logical level state of the B signal causes the A signal 290 to remain in the same state that initiated the XOR functionality of the NAND gates 282–288, and the function clock signal 124 remains asserted for the full duration of the half cycle of the selected source clock signal 122 which initiated the pulse of the function clock signal 124 in the first instance. As a result, the logic high portion of one cycle of the function clock signal 124 has the same time duration as the half cycle of the selected source clock signal 122 which initiated that pulse.

The function clock generator 240 stays in this condition until the occurrence of the next edge of the selected source clock signal 122. The next edge of the selected source clock occurs at one-half of the period of the selected source clock signal 122, which would be one full period of the function clock signal 124 if it was not inhibited but instead was allowed to oscillate at its normal frequency. Thus, the logical low portion of the function clock signal 124 is also stretched for the amount of time that would be a complete clock cycle of the uninhibited function clock signal. Under these circumstances, the frequency of the function clock signal 124 is reduced by two, to a frequency which is the same as the frequency of the selected source clock signal 122.

The assertion of a logical high-value of the rising edge primary signal 244 causes the XOR gate 292 to function as an inverter. A signal 290 becomes an inverted copy of the B signal 308. By inverting the logical level of the A signal 290 when the rising edge primary signal 244 is asserted, the effect of change in the logical state of one of the input signals to the XOR functionality of the NAND gates 282–288 is to cause those NAND gates to gate from the opposite edge of the selected source clock signal 122. Because of the circuit connections of the NAND gates 282–288 as shown in FIG. 5, a rising edge of the function clock signal 124 occurs in conjunction with a rising edge of the selected source clock signal 122 when the rising edge primary signal 244 is asserted. When the rising edge primary signal 244 is negated, the rising edge of the pulses from the function clock signal 124 is triggered from the falling edge is of the selected source clock signal 122.

The principal purpose to for the designation of a primary clock edge is to facilitate synchronization of the instruction sequence with the selected source clock signal 122, in conjunction with the wait instruction discussed below in connection with FIG. 13. In the dual edge function clock generator 240 the rising edge primary signal 244 controls the polarity of the A signal 290 such that the primary clock edge will produce a low to high transition of the function clock signal upon the negation of the function halt signal 242.

The function clock generator 240 is halted during the assertion of the function halt signal 242. When halted, the flip-flop 296 is reset, meaning that the B signal 308 is at a logic high state. If the rising edge primary signal 244 is high the XOR gate 292 will cause the A signal 290 to be low. The low A signal 290 is applied to the NAND gates 282 and 286, which means that the XOR functionality of the NAND gates will not invert the selected source clock signal 122. Consequently a rising edge of the selected source clock signal 122 will create a rising edge of the function clock signal 124.

The rising edge primary signal 244 puts the A signal 290 in a low state when the function halt signal 242 is negated and the function clock generator 240 is allowed to run, the next edge of the correct rising polarity creates the rising edge of the function clock signal 124 to start the sequence of instruction execution after the wait instruction. The necessary synchronization to run a multiplexer in the data path occurs. This is an advantage because it is extremely difficult to perform static timing analysis, let alone dynamic closure on timing loops, when multiplexers are used in the clock path.

Figure 6:
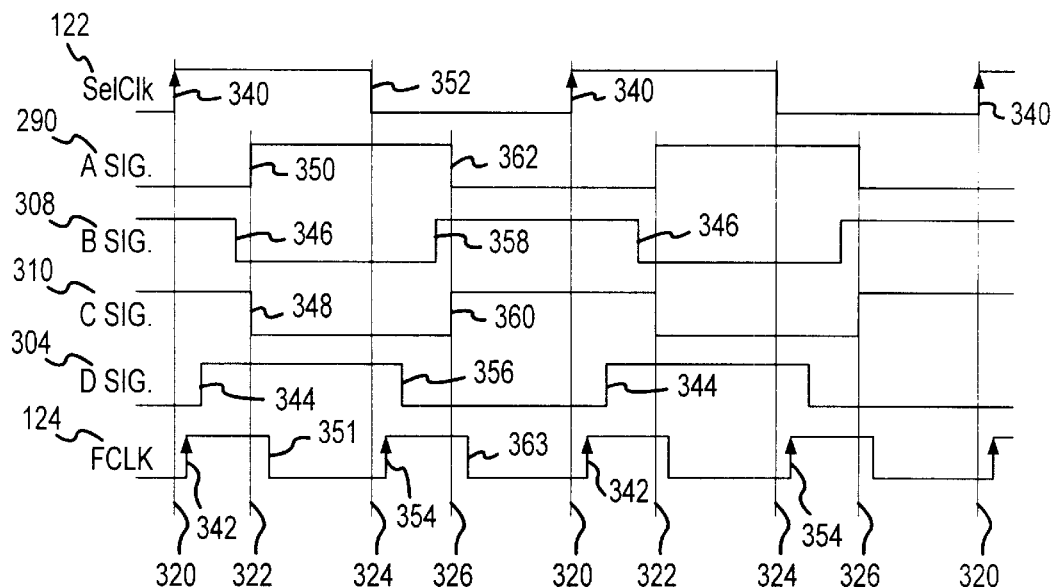
FIGS. 6, 7, 8 and 9 are each collections waveform diagrams of signals present in the function clock generator shown in FIG. 5 which are coordinated in time relationship to one another and which which illustrate the functionality of that function clock generator under different conditions.
Figure 7:
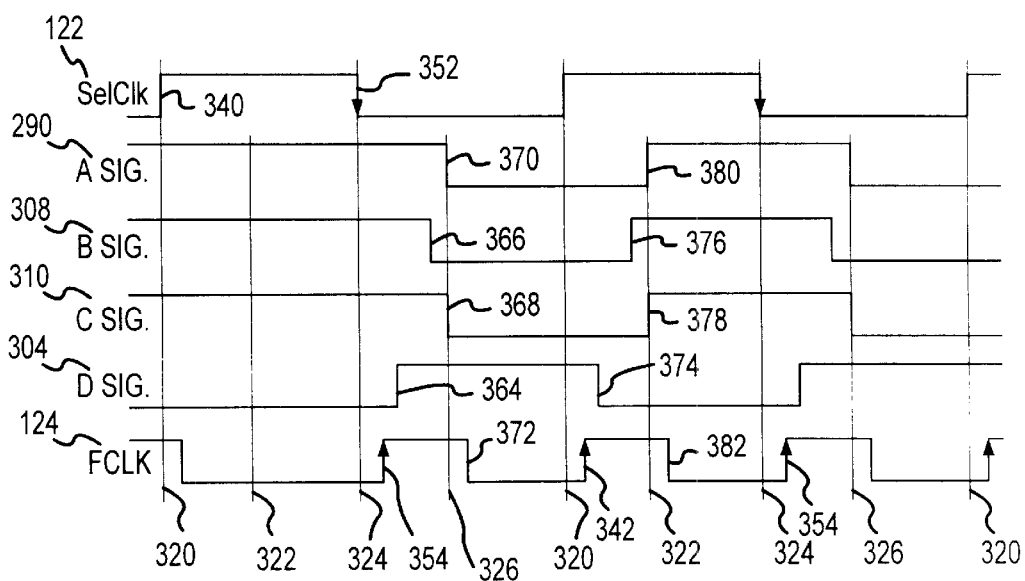
Figure 8:
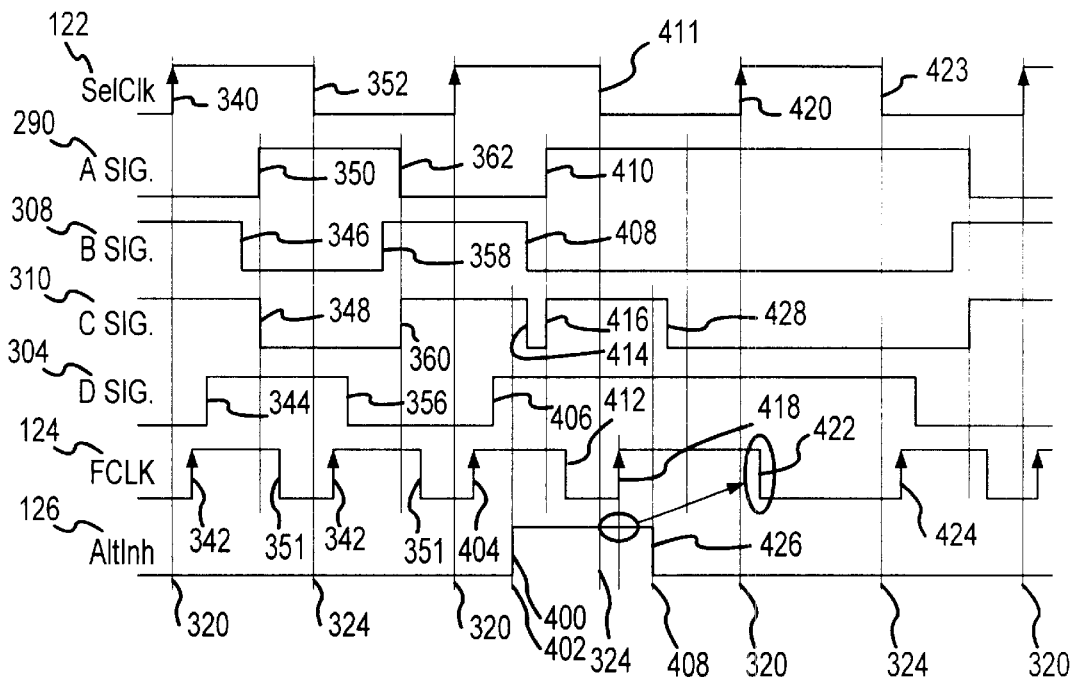
Figure 9:
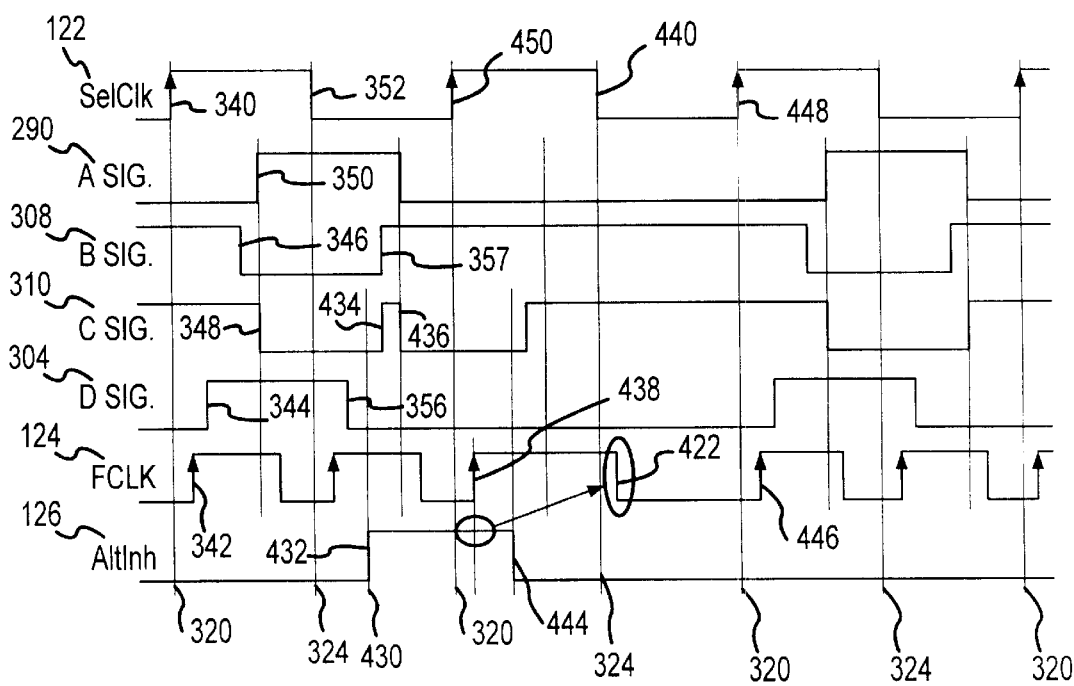

The above described functionality of the dual edge function clock generator 240 is shown in greater detail under conditions of asserting of the rising edge primary signal 244 in FIG. 6, of negating the rising edge primary signal 244 in FIG. 7, and of asserting the alternate inhibit signal 126 in FIGS. 8 and 9. In the waveform diagrams shown in FIGS. 6, 7, 8 and 9, time delays are shown in a greatly exaggerated manner compared to the time delays which will actually occur in the circuitry of the function clock generator 240. All numerical references to components of the function clock generator 240 made in conjunction with the description of FIGS. 6, 7, 8 and 9 refer to FIG. 5.

The situation shown in FIG. 6 is based on a rising edge primary signal 244 (FIG. 5) asserted at a high logical level. The selected source clock signal 122 establishes a beginning time reference point 320 for each cycle of the selected source clock signal 122, and the timing reference point for the function clock signal 124, the A signal 290, the B signal 308, the C signal 310 and the D signal 304. Another timing reference point 324 denotes the beginning of the logical low portion or phase of each cycle of the selected source clock signal 122. The frequency of the function clock signal 124 is twice the frequency of the selected source clock signal 122. A rising edge 340 of the selected source clock signal 122 and a logic low level of the A signal 290 at time reference 320 cause the function clock signal 124 to assume a high logical level at a rising edge 342, as a result of the XOR functionality of the NAND gates 282–288. The rising edge 342 of the function clock signal 124 occurs after a slight time delay interval from the reference point 320. The rising edge 342 of the function clock signal 124 clocks the flip-flop 296 and causes a rising edge 344 of the D signal 304 to be applied to the delay element 298, after a short propagation delay through the flip-flop 296. The delay element 298 and the inverter 300 generate a falling edge in the B signal 308. The falling edge 346 of the B signal 308 is a time delayed and inverted copy of the D signal 304. The C signal 310 is a time delayed copy of the B signal 308, as a result of the propagation delay through the XOR gate 302. A falling edge 348 of the C signal 310 occurs at a time reference 322 which is delayed relative to the falling edge 346 of the B signal 308.

Because the alternate inhibit signal 126 is negated, the XOR gate 302 functions as an OR gate. However, because the rising edge primary signal 244 is asserted, the XOR gate 292 functions as an inverter, causing the A signal 290 to be in inverted copy of the B signal 308. A rising edge 350 of the A signal 290 is time delayed with respect to the falling edge 346 of the B signal 308, because of the propagation delay through the XOR gate 292. The propagation delay through the XOR gate 292 is approximately the same as the propagation delay through the XOR gate 302, thereby causing the rising edge 350 of the A signal 290 to occur approximately at the same time as the falling edge 348 of the C signal 310 occurs at time reference 322.

With the change in logical level of the A signal 290 at time 322, the high logical level of the selected source clock signal 122 and the high logical level of the A signal 290 cause the XOR logic functionality of the NAND gates 282–288 to generate a low logical output signal within a short time delay after the time reference 322, as shown by the falling edge 351. This change in state of the function clock signal 124 from its previously high state to a low state occurs after a propagation delay through the NAND gates 282–288, and causes the function clock signal 124 to transition from a logical high level to a logical low level at the falling edge 351.

The transition of the selected source clock signal 122 from a high logical level to a low logical level at a falling edge 352, which occurs at reference point 324, causes the XOR logic functionality of the NAND gates 282–288 to initiate another rising edge 354 of the function clock signal 124. The rising edge 354 occurs a short time after the time reference 324. The rising edge 354 clocks the low logical level of the C signal 310 through the flip-flop 296 as the D signal 304, thereby creating a falling edge 356 at a time which is slightly after the rising edge 354. After a time delay caused by the delay element 298 and the inversion caused by the inverter 300, a rising edge 358 of the B signal 308 occurs. The propagation delay through the XOR gate 302 causes a rising edge 360 of the C signal 310 to occur. The propagation delay through the XOR gate 292 causes the A signal 292 to assert a falling edge 362 at approximately the time reference 326. The change in logical state of the A signal 290 at time reference 326 causes the XOR logic functionality of the NAND gates 282–288 to change the high logical state of the function clock signal 124 to a low logical state at the falling edge 363, after a slight propagation time delay through the NAND gates 282–288. The functionality just described continues with each subsequent cycle of the selected source clock signal 122 so long as the rising edge primary signal 244 is asserted.

When the rising edge primary signal 244 is negated, as a shown in FIG. 7, the XOR gate 292 ceases functioning as an inverter and starts functioning as an OR gate. Consequently, the A signal 290 is no longer an inverted copy of the B signal 308, which is the situation illustrated in FIG. 6. Instead, as illustrated in FIG. 7, the previous state of the A signal 290 remains unchanged for the duration of the first half-cycle (as shown) of the selected source clock signal 122 between references 320 and 324. The constant state of the A signal during the first half-cycle of the selected source clock signal 122 causes the XOR logic functionality of the NAND gates 282–288 to asserting the function clock signal 124 at the low state during the same time period. It is only after the selected source clock signal 122 changes states at the end of the first half-cycle at the first reference point 324, that the functionality of the function clock generator 240 resumes.

Referring now to FIG. 7, the rising edge 354 of the function clock signal 124 clocks the logical level of the C signal 310 through the flip-flop 296, causing a rising edge 364 of the D signal 340. After a time delay through the element 298 and inversion by the inverter 300, the D signal 340 causes the B signal 308 to fall at a falling edge 366. The B signal 308 propagates through the XOR gate 302 causing a falling edge 368 of the C signal 310. Approximately simultaneously, a falling edge 370 of the A signal 290 occurs as a result of a similar propagation through the XOR gate 292. The simultaneous low levels of the selected source clock signal 122 and the A signal 290 at the time reference 326 causes a falling edge 372 of the function clock signal 124 after a slight time delay through the NAND gates 282–288.

The next rising edge 342 of the function clock signal 124 clocks the C signal 310 through the flip-flop 296 and causes a falling edge 374 of the D signal 340. After a time delay and an inversion, a rising edge 376 of the B signal 308 occurs, thereby causing rising edges 378 and 380 of the C signal 310 and the A signal 290, respectively. The change in state of the A signal 290 at the time reference 322 causes the XOR functionality of the NAND gates 282–288 to terminate the high level of the function clock signal at a falling edge 382.

In the manner illustrated by FIG. 7, the negation of the rising edge primary signal 244 causes the dual edge function clock generator 240 to generate the rising edges 354 of the function clock signal 124 with reference to the falling edges 352 of the selected source clock signal 122. Under this condition, the falling edges 352 of the selected source clock signal 122 are the primary edges, because it is with respect to those falling edges 352 that the rising edges 354 of the function clock signal 124 are generated. Conversely in the manner illustrated by FIG. 6, the assertion of the rising edge primary signal 244 causes the rising edges 354 of the function clock signal 124 to be generated with reference to the rising edges 340 of the selected source clock signal 122. Two cycles of the function clock signal 124 still occur for each cycle of the selected source clock signal 122 in both cases.

The effect of asserting the alternate inhibit signal 126 at a falling edge of the selected source clock signal 122 is illustrated in FIG. 8. The conditions shown in FIG. 8 assumes that the rising edge primary signal 244 is asserted at a high level. The same functionality of the function clock generator 240 occurs during the first full cycle of the selected source clock signal 122 between the first and second time reference points 320 as shown, as the functionality which has been described in conjunction with FIG. 6. However, during the second full cycle of the clock in signal between the second and third time reference points 320 as shown, a high alternate inhibit signal 126 is asserted. A rising edge 400 of the alternate inhibit signal 126 occurs at a time reference 402. A rising edge 404 of the function clock signal 124 has occurred prior to the time reference 402, and that rising edge 404 has clocked the high level C signal 310 through the flip-flop 296 to cause a rising edge 406 of the D signal 304.

In the manner previously described, the D signal 304 is inverted and time delayed to create the B signal 308. The B signal 308 transitions to a low logical level at a falling edge 408. The low level of the B signal 308 following the falling edge 408 is propagated through the XOR gate 292. The XOR gate 292 functions as an inverter because of the assertion of the rising edge primary signal 244, causing a rising edge 410 of the A signal 290. The logic high level of the A signal 290 after the rising edge 410 and a logic low signal of the selected source clock signal 122 at the falling edge 411 combine in the XOR logic functionality of the NAND gates 282–288 to change the output level of the function clock signal 124 and create a falling edge 422.

The assertion of the alternate inhibit signal 126 to the XOR gate 302 at the time reference 402 causes the XOR gate 302 to function as an inverter with respect to the B signal 308, rather than as an OR gate as it did prior to the assertion of the alternate inhibit signal 126. Functioning as an inverter, the XOR gate 302 causes the C signal 310 to transition to a low state at a falling edge 414. Prior to the assertion of the alternate inhibit signal 126, the XOR gate 302 caused the C signal to assume a logical high state as is shown between the rising edge 360 and the falling edge 414. However, because the B signal 308 has just transitioned to a logic low level at its falling edge 408, the transitioned B signal 308 causes the XOR gate 302 to change the C signal 310 back to a logic high level at the rising edge 416.

Meanwhile, the selected source clock signal 122 transitions to a logic low level at the falling edge 411. The XOR functionality of the NAND gates 282–288 causes the function clock signal 124 to change states at a rising edge 418. The rising edge 418 clocks the logic high level of the C signal 310 through the flip-flop 296, causing a logic high level in the D signal 304. Prior to this event, the D signal 304 was already at a high logical level starting from the rising edge 406. Therefore, no change occurs in the logic level of the D signal 304. Because there is no change in the D signal 304, there is also no change in the B and A signals 308 and 310.

Since the A signal 290 does not change, the next change of state of the function clock signal 124 occurs as a result of a rising edge 420 of the selected source clock signal 122. The logical high levels of the selected source clock signal 122 and the A signal 290 after the rising edge 420, causes the function clock signal 124 to transition to a logic low level at a falling edge 422. The function clock signal 124 remains in a logic low level until the occurrence of the time reference 324, at which time the selected source clock signal 122 transitions from a logic high to a logic low level at the falling edge 423. This transition causes a rising edge 424 of the function clock signal 124. Notice that the logic high state of the A signal 290 remains asserted for more than an entire cycle of the selected source clock signal 122. By inhibiting the next rising edge 418 of the function clock signal after the assertion of the alternate inhibit signal 126, the subsequent falling edge 422 and the subsequent rising edge 424 of the function clock signal 124 are derived solely by the change in logic levels of the selected source clock signal 122, because the A signal 290 remains in an unchanged logic state. Thus, the alternate inhibit signal 126 inhibits the next rising edge of the function clock signal 124 occurring at its normal frequency, but the XOR logic functionality of the NAND gates 282–288 completes the definition of the extended cycle of the function clock signal at the same frequency as the selected source clock signal 122.

In essence, the assertion of the alternate inhibit signal 126 changes the logical state of the C signal 310, causing the next rising edge 418 of the function clock signal 124 not to cause a change in state of the D signal 304, the B signal 308, or the A signal 290. These signals 304, 308 and 290 remain unchanged for the next two selected source clock signal 122 edge transitions. A full cycle of the function clock signal 124 occurs at the same frequency as the selected source clock signal 122.

If the alternate inhibit signal 126 remains asserted for more than one period of the selected source clock signal 122, the logic levels of the A signal 290, the B signal 308, the C signal 310 and the D signal 304 remain unchanged for the duration of that alternate inhibit signal. It is necessary for a rising edge of the function clock signal 124 to occur before the flip-flop 296 is clocked. However when the rising edge of the function clock signal 124 does occur, for example the rising edge 424, the levels of the C signal 310 and the D signal 304 are the same as a result of the assertion of the alternate inhibit signal 126, resulting in no changes in the logic levels of the A signal 290, the B signal 308 and the C signal 310. By retaining the unchanged logic level of the A signal 290, the rising and falling edges of the function clock signal 124 are defined entirely by the rising and falling edges of the selected source clock signal 122, through the XOR logic functionality of the NAND gates 282–288. Consequently, the function clock signal 124 continues to exhibit the same frequency as the frequency of the selected source clock signal 122.

After the alternate inhibit signal 126 is negated to a low logic level, the function clock generator 240 assumes normal operation with the frequency of the function clock signal 124 being twice the frequency of the selected source clock signal 122. The C signal 310 remains high until a falling edge 426 of the alternate inhibit signal 126 occurs, which is shown in FIG. 8 as occurring at time reference 408. The falling edge 426 of the alternate inhibit signal 126 causes the XOR gate 302 to again function as an OR gate. Thereafter, the XOR gate 302 causes the C signal 310 to transition from the logic high level to the logic low level at a falling edge 428.

Thus, the practical effect is that so long as the alternate inhibit signal 126 is asserted, the frequency of the function clock signal 124 is reduced by half to the frequency of the selected source clock signal 122. Of course, reducing the frequency of the function clock signal 124 has the effect of reducing the rate at which instructions are executed. This has the practical effect of slowing the execution of instructions by the interface 100. However, slowing the execution of certain instructions has the beneficial effect of actually increasing the efficiency of I/O transfers through the interface 100, as well as having the effect of saving power or reducing power consumption, as is described below.

FIG. 9 illustrates the situation of asserting the alternate inhibit signal 126 at a rising edge of the selected source clock signal 122. The functionality of the function clock generator 240 is the same as has been previously described in conjunction with FIG. 8, between the time reference 320 and a time reference 430 shown in FIG. 9. At time reference 430, the alternate inhibit signal 126 is asserted and transitions from a logic low level to a logic high level at a rising edge 432. The rising edge 432 of the alternate inhibit signal 126 occurs prior to the rising edge 450 of the selected source clock signal 122, and after the occurrence of the preceding falling edge 352. The change in logic level of the alternate inhibit signal 126 at the input of the XOR gate 302 causes a rising edge transition at 434 of the C signal 310. The high to low transition of the D signal 304 at the falling edge 356 causes the D signal 308 to transition from a low to high level at the rising edge 356. The transition from the low to high state of the B signal 308 at the edge 357 is applied to the input terminal of the XOR gate 302, which causes the C signal 310 to transition from the high to low level at a falling edge 436.

The transition at the next rising edge 438 of the function clock signal 124 does not change the logic level of the D signal 304 when the C signal 310 is clocked through the flip-flop 296. Instead, the prior states of the D signal 304, the B signal 308, and the A signal 290 remain as they were before the flip-flop 296 was clocked. A transition of the function clock signal 124 therefore can occur at a falling edge 442 only when the selected source clock signal 122 transitions at its falling edge 440. Moreover, because a rising edge of the function clock signal 124 will not occur until rising edge 446, the logic levels of the A signal 290, the B signal 308, the C signal 310 and the D signal 304 remain in their existing logic levels until the occurrence of a rising edge 448 of the selected source clock signal 122, thus completing the cycle of the function clock signal between the edges 438 and 446 at the frequency of the selected source clock signal 122.

After the alternate inhibit signal 354 is negated at falling edge 444, no change can occur until the next rising edge 446 of the function clock signal 124. However the next rising edge 446 of the function clock signal 124 is only generated after the selected source clock signal 122 transitions to from a logic low to a logic high state at the rising edge 448. By the time that the rising edge 448 occurs, the function clock signal 124 will have executed one complete cycle at the frequency of the selected source clock signal 122, as shown between the rising edge 438 and the rising edge 446 of the function clock signal 124.

FIG. 9 illustrates the condition of asserting the alternate inhibit signal 126 at a rising edge 450 of the selected source clock signal 122. FIG. 8 illustrates the assertion of the alternate inhibit signal 126 at a falling edge 411 of the selected source clock signal 122. In both cases, the function clock signal 124 assumes the frequency of the selected source clock signal 122 for one cycle of the selected source clock signal 122 beginning with the edge upon which the alternate inhibit signal 126 was asserted. In both cases, the frequency of the function clock signal 124 is reduced to and made the same as the frequency of the selected source clock signal 122.

FIGS. 8 and 9 also illustrate the effect of a slight glitch in the C signal from the XOR gate 302 which occurs because of the assertion of the alternate inhibit signal 126 prior to the assertion of the B signal 308 at time reference 357. This glitch is shown in FIG. 8 between the edges 414 and 416 of the C signal 310, and by the glitch shown between the edges 434 and 436 of the C signal 310 shown in FIG. 9. However, this glitch has no adverse influence on the operation of the function clock generator 240 because the glitch will have settled prior to the next rising edge of the function clock signal 124. It is only with a rising edge of the function clock signal 124 that the change in state of the function clock generator 240 can occur.

Figure 10:
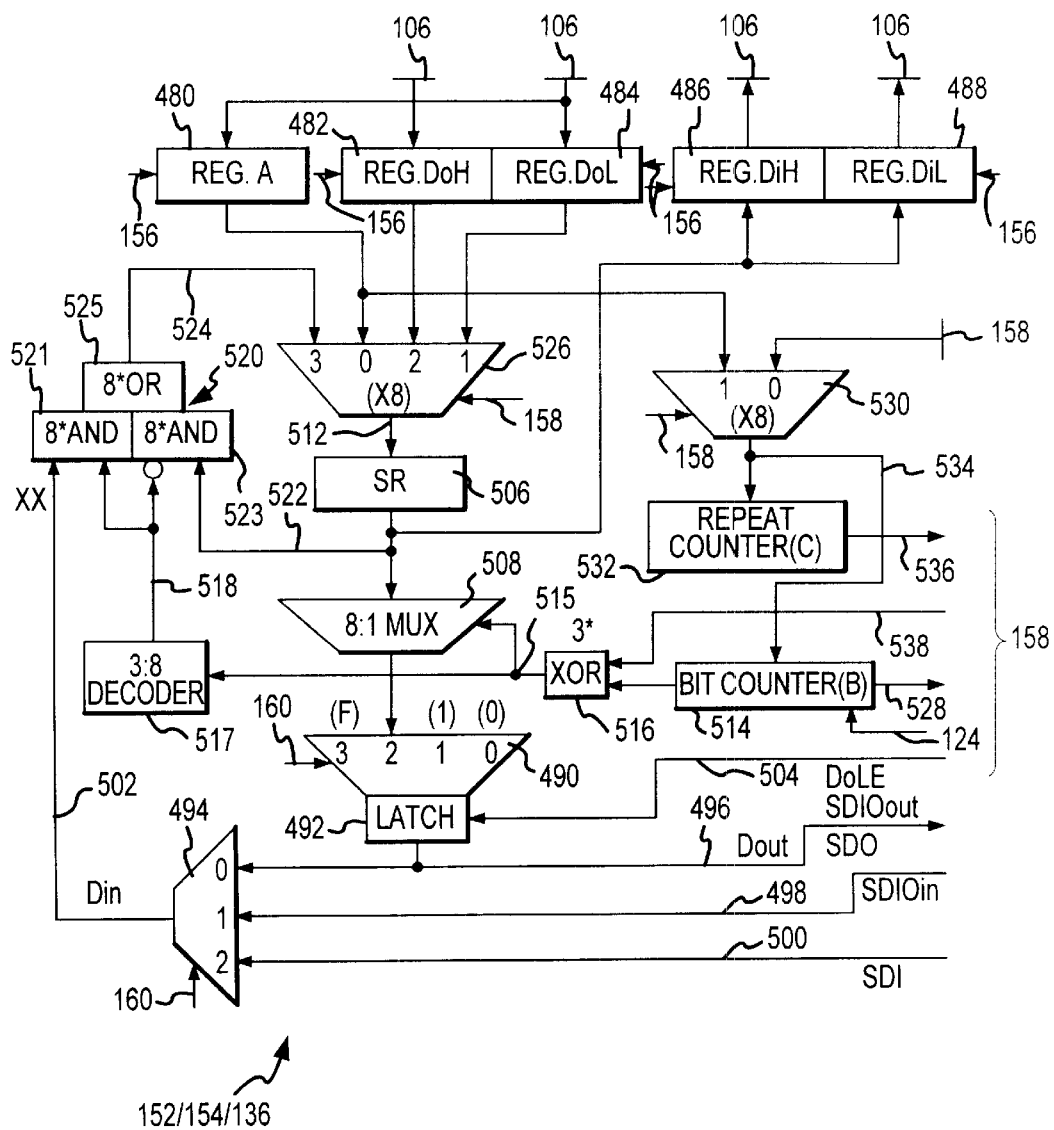
FIG. 10 is a functional logic and block diagram of the data path section of the reprogrammable interface shown in FIG. 3.

The functional characteristics of the function clock generator 240, are advantageously used with the I/O segment of the interface 100, shown in FIG. 3. As shown there, the I/O segment is formed by the data queue 152, the data path elements 154 and the internal I/O logic interface 136. More details concerning these elements 152, 154 and 136 are shown in FIG. 10. A convention used in FIG. 10 is that the wide lines describe multi-bit wide parallel signal paths, while the narrow lines described single bit wide paths. All multi-bit paths are 8 bits wide except for those associated with the bit counter 514 and bit counter 532 including paths 158, 534 and 528.

As shown in FIG. 10, the data queue 152 (FIG. 3) is formed by an address register (Reg. A) 480, a high order data out register (Reg. DoH) 482, a low order data out register (Reg. DoL) 484, a high order data in register (Reg. DiH) 486 and a low order data in register (Reg. DiL) 488. These registers 480–488 are connected to the internal bus 106 to enable communication of information between these registers and the embedded processor 104 (FIG. 1) over the system bus 106. The address register 480 is preferably an 8 bit register which is write only from the internal bus 106 and read-only to the remainder of the interface 100. The address register 480 is used by the embedded processor 104 (FIG. 1) to supply address information the address transfer phase of a serial interface bus protocol that includes an explicit bus transfer phase. The high and low order data out registers 482 and 484 are each preferably 8-bit registers which are write only from the internal bus 106 and read-only to the interface 100. In cases where the internal bus is greater than 8 bits wide, data from both the high order register 486 and the data from the low order register 484 are supplied to form a 16 bit wide word. The data which is to be transmitted or output by the interface 100 is transferred to the data out registers 482 and 484 from the internal bus 106. The high and low order data input registers 486 and 488 are also each preferably 8 bit registers which are read-only to the internal bus 106 and write only from the interface 100. In those cases where the internal bus 106 is 16 bits wide, both the data from the high order register 486 and the data from the low order register 488 are supplied. Data which is received by the interface and which is to be communicated to the other components of the system chip 102 is supplied by the interface 100 to the data in registers 486 and 488, and thereafter is read from those registers 486 and 488 over the system bus 106.

The internal I/O logic interface 136 (FIG. 3) is formed by a 4 to 1 data output multiplexer 490 to which an output latch 492 is connected. This 4 to 1 multiplexer 490 allows the generation of logic 0 and logic 1, serial output from the SR register or from the F (flag) flip-flop. The output latch 492 is connected to supply output signals from the multiplexer 490 to the conductor 496. A 3 to 1 data input multiplexer 494 is also part of the internal I/O logic interface 136. The zero terminal of the multiplexer 494 is connected to the latch 492. The output signals supplied from the data out multiplexer 490 is presented on conductor 496 as serial data out signals (SDO). In the case of half duplex transmissions, the data out supplied at 496 is referred to as serial data out (SDO). In the case of full duplex communication, the data out supplied at 496 is referred to as serial data I/O out (SDIOout). In addition, the signals on conductor 496 may be conducted back internally through the data in multiplexer 494. Supplying this output data back to the interface is useful for loopback testing of the interface and the embedded processor 104 (FIG. 1).

The one and two input terminals of the data in multiplexer 494 are connected to receive serial data input signals at 498 and 500, respectively. The serial data I/O signals (SDIOin) 498 result from full duplex communication. The serial data in signals 500 (SDI) result from half duplex communication. The output signals from the data in multiplexer 494 occur at 502 and are referred to as data in (Din) signals. The data in (Din) signals 502 may be any of the signals applied at 496, 498 and 500, passed through the data in multiplexer.

The latch 492 is used to hold the value of the data out signal 496 during portions of full-duplex, split-clock operation, thereby preventing captured input data from feeding through as data output signals 496. A Data out latch enable control signal (DoLE) 504 is asserted to close the latch 492 and is negated to open the latch. The data out latch enable control signal 504 is always negated except in cases of full duplex, split clocking serial data communication.

The remaining components of the data path segment shown in FIG. 10 form the data path elements 154 (FIG. 3). A serialization register (SR) 506 is a key component of the data path segment. The serialization register 506 holds the byte undergoing parallel-to-serial conversion for output and/or serial-to-parallel conversion for input. The serialization register 506 may be used to both output serialization and input de-serialization when performing full duplex transfers. The serialization register 506 is an eight-bit parallel register. The serialization function is performed by an 8 to 1 multiplexer 508 which selects one bit of the serialization register 506 designated by a bit counter 514 to be provided to the output multiplexer 490. De-serialization is performed by merge logic 520 as driven by a 3 to 8 decoder 517, as discussed below.

One of the advantages of using the serialization register 508 as a 8 bit parallel register, which is connected to the multiplexors 508 and 490, is that as soon as the data is present in the serialization register 506, and the bit counter 114 is set to control multiplexor 508 (assuming multiplexer 490 is set to select the output of multiplexer 508), the first bit signal of data is immediately presented as output at 496. This avoids the problem of requiring one or more clock signals to shift out the first bit signal of data, which would be required if the serialization register 506 was formed as a shift register. One advantage of this arrangement is that the first bit out does not have to be the high order or the low order bit, and there is uniform time for that bit to be presented, because it is being selected from a parallel register by a multiplexer, rather than having to be shifted to the end of the register to reach the output. Another advantage of this arrangement is that, when a the data output function is enabled, loading the serialization register 506 causes the appropriate first bit to reach the output at 496 by simple propagation very quickly through a few stages of logic. This means that a single clock edge that executes an instruction that loads the serialization register 506 from one of the registers 480, 482 and 484 can also make the first bit available as output at 496 regardless of where in the byte that first bit is located. This offers a significant improvement over conventional hard wired, multi-mode interfaces that need intermediate clocks to shift the bits into the shift registers and into the right positions in the shift registers. The use of the multiplexors 526, 508 and 490, in conjunction with the serialization register 508 and the bit counter 514, does not require such internal clocks, and as a result, enables the interface 100 to operate at a relatively low clock rate of the selected source clock signal 122.

Serialization of the contents of the serialization register 506 is accomplished through an 8 to 1 serialization multiplexer 508, which is connected between the output of the serialization register 506 and the data out multiplexer 490. Deserialization is accomplished by merging a serial input bit (Din) applied at 512 into a position in the serialization register 506 selected by a three-bit value in a bit counter (B) 514. The three bit value in the bit counter 514 is conducted through three XOR gates 516 as a bit position control signal 515 which is applied to both the serialization multiplexer 508 and to a 3 to 8 decoder 517. The decoder 517 selects the desired position for the serial input bit in accordance with a position control signal 515 and applies the selected selection signal 518 to an 8 bit wide AND/OR bit merge logic 520.

The merge logic 520 includes an array 521 of eight AND gates. A copy of the data in signal 502 is applied to each of these and gates along with the signals 518 from the decoder 517. Another array 523 of eight AND gates receives one copy each of the output signal 522 from the serialization register 506, and the inversion of the signal 518 from the decoder 517. The logical outputs from the AND gate arrays 521 and 523 is applied to an array 525 of 8 OR gates. The logical results of the OR gate functionality is a signal at 524 which is formed by seven of the old bits and one new bit from 502.

A data path multiplexer 526 supplies selected ones of four input signals as the data in signal 512 to the serialization register 506. The zero input terminal of the data path multiplexer 526 receives address signals from the address register 480. The one input terminal of the multiplexer 526 receives the low order data byte from the low order data register 484. The two input terminal of the data path multiplexer 526 receives the high order data byte from the high order data register 482. The three input terminal of the data path multiplexer 526 receives the output signal 524 from the logical network 520.

A feedback path by which to keep the data in signal 512 equal to the SR output signal 522 is established through the merge logic 520. This feedback functionality in conjunction with the bit counter 514, the multiplexer 508 and the decoder 517 allows repeated execution of a single instruction for successive input bits, without the necessity to perform the typical state transition steps of fetching the instruction, decoding the instruction and executing the instruction, and thereafter incrementing the program counter and returning to a state ready to fetch the next instruction. As a result of this feedback functionality, it is unnecessary to clock through as many states as would otherwise be required, and it is unnecessary to have as many different instructions as might otherwise be required.

The bit counter 514 is preferably a three bit, synchronous up counter with synchronous load and asynchronous reset. A value of the bit counter 514, supplied at 528, is reset to zero when the serialization register 506 is loaded. The value 528 of the bit counter 514 is loaded from the low order three bit of an instruction byte supplied from the instruction decoder 150 (FIG. 3) at 158. The low order three bits of the value of the address register 480 are also supplied to the load value selection multiplexer 530, and these three bits can also be used to load the bit counter 514.

When counting, the value of the bit counter 514 is incremented by one, with wraparound from bit 7 to bit 0, by each execution or repetition of certain instructions. The bit counter 514 increments on rising edges of the function clock signal 124. The bit counter 514 counts up, which provides direct support for the least significant bit first (little endian) bit ordering. To perform most significant bit first (big endian) bit ordering is accomplished by complementing the value of the bit counter 514 by asserting a big endian control signal 538 into the XOR gate 516. The bit counter 514 is an up counter, the position control signal 515 can be made to countdown by the application of the big endian control signal 538 applied to the XOR gate 516. When the big endian control signal 538 is negated, the XOR gate 516 functions as an OR gate. When the big endian control signal 538 is asserted, the XOR gate 516 functions as an inverter to invert the value from the bit counter 514. Inverting the incrementing count value from the bit counter is the equivalent of decrementing the count value as far as the position control signal 515 is concerned. However, by using an up counter the end of byte condition is uniformly the rollover of the value of the bit counter 514 from 7 to 0.

An output value 534 from the load value selection multiplexer 530 is applied to a repeat counter 532 as well as to the bit counter 514. The repeat counter 532 is a down counter with synchronous load and asynchronous reset. The repeat counter 532 is used for a variety of purposes, including counting the number of repetitions of specific instructions executed by the instruction decoder 150 (FIG. 3). A value of the repeat counter 532 is loaded with a load instruction, by the output value 534 selected by the load value selection multiplexer 530. The value of the repeat counter 532 is supplied at 536.

In the following discussions of instructions executed by the reprogrammable interface 100, the value in the bit counter 514 is referred to as a "B" value, and the value in the repeat counter 532 is referred to as the "C" value.

The functionality of the interface 100 is the achieved by the use of a relatively small number of instructions recorded in locations of the instruction store 144 (FIG. 3). The function clock generator 240 (FIGS. 4 and 5) and the I/O section 152/154/136 (FIG. 10) combine with extensive control functionality available from a small number of the instructions to achieve significantly functional efficiency in performing I/O transfers without consuming power by requiring an extensive number of clock cycles and while implementing the entire functionality of the reprogrammable interface 100 in a relatively small amount of space on the system chip 102 (FIG. 1). Another significant feature of this data path and instruction set is that is that typical serial protocols can be implemented using sequences of instruction words that are only eight bits long, in contrast to other processors and controllers which routinely require instructions of a much larger number of bits. The eight bit instructions permit reductions in size of the instruction store 144, thereby helping to minimize the size of the interface 100.

The instructions stored in the program store 144 (FIG. 3) include those which execute many typical and well-known processing functions, such as load and store instructions which read values or data into registers or memory, a strobe instruction which asserts a specified discrete control signal to achieve certain effects, a conditional skip instruction which allows one or more of addresses of subsequent instructions to be skipped over, a branch instruction which performs an unconditional absolute branch to a specified target address of an instruction, and a loop instruction that performs a conditional relative branch backward to an address before the loop instruction. These typical instructions are not described herein further detail because of their conventional nature. However, certain instructions are described below a detail because they provide highly efficient functionality for the reprogrammable interface 100.

Figures 11, 12:
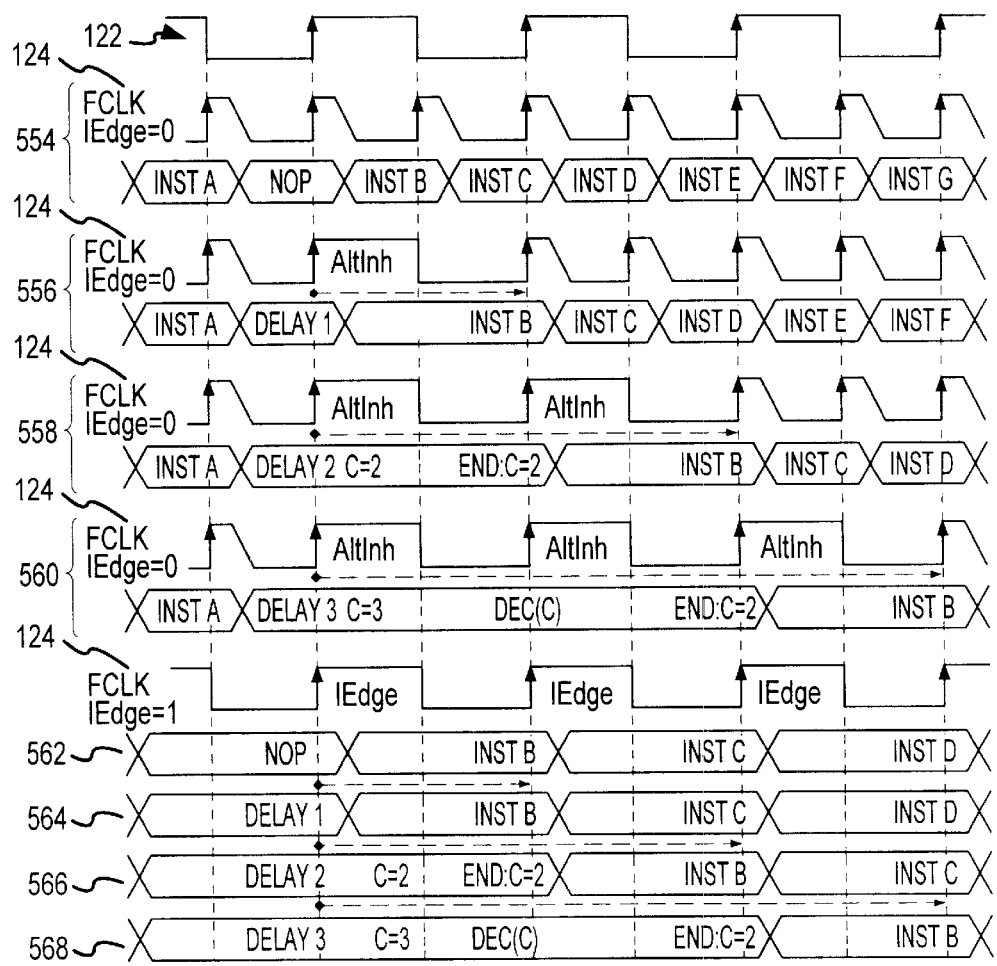
FIG. 11 is a graphical illustration of the bit fields of a delay instruction recorded in an instruction store of the reprogrammable interface shown in FIG. 3.
FIG. 12 is a collection of waveform diagrams which are coordinated in time relationship to one another and to the selected source clock signal and a function clock which illustrate the functionality of the reprogrammable interface in response to executing the delay instruction shown in FIG. 11.

The fields or components of delay instruction 550 are shown in FIG. 11. The delay instruction 550 delays the further execution of any instruction for a number of cycles of the function clock signal 124 which are specified in a count field 552 formed by bits 0 and 1 of the instruction 550. In the example shown in FIG. 11, a 2 bit count field is used. The count field could be wider to permit longer delays if needed by interface requirements and allowed by the number of code bits available. The value of the count field 552 (C) is loaded into the repeat counter 532 (FIG. 10). A value of 0 in the count field 552 produces a NOP instruction. In essence, no instruction is executed and the NOP instruction simply consumes one cycle of the function clock signal. A value of 1 in the count field 552 delays the execution by one cycle of the function clock signal (for a total of 2 cycles of the function clock signal) when the function clock signal is also oscillating at its normal frequency of twice the selected source clock signal 122. The delay caused by a count value of 1 in the count field 552 is achieved by asserting the alternate inhibit signal 126. Values in the count field 552 greater than 1 execute periods, not edges, of the selected source clock signal 122 (selected source clock signal 122), so in this case timing is not affected by the one edge signal.

Examples of the effects from the delay instruction 550 are shown in FIG. 12, as referenced to the selected source clock signal 122 (selected source clock signal 122). In these examples, the effects of the delay (NOP) instructions 550 on the sequential execution of various instructions A, B, C, D, E, F and G is shown. In the examples shown in rows 554, 556, 558 and 560 the one edge signal 250 (FIG. 4) is negated, but in the example shown in rows 552, 554, 556 and 558, the one edge signal is asserted. At row 554, instruction is executed at the first rising edge of the function clock signal 124. This instruction is followed by the execution of a NOP instruction at the second rising edge of the function clock signal. The execution of this NOP instruction consumes one cycle of the function clock signal, the time of execution of instruction B after instruction A. Thereafter, instructions C to G occur in sequence.

As shown at row 556 in FIG. 12, a delay 1 instruction is executed after the instruction A. The delay 1 instruction is executed by asserting an alternate inhibit signal 126, which has the effect of delaying the execution of instruction B until the next subsequent rising edge of the function clock signal 124. Thus, the execution of the delay 1 instruction has in essence delays the execution of the instruction B for two cycles of the function clock signal 124.

As shown at row 558 in FIG. 12, a delay 2 instruction is executed after the A instruction. In executing the delay 2 instruction, the value in the repeat counter 532 (FIG. 10) is set to a value of 2. This causes the alternate inhibit signal 126 to be asserted for two complete cycles of the selected source clock signal 122, to delay the execution of instruction B for that many cycles of the selected source clock signal 122. Because of the relative timing between the selected source clock signal 122 and the function clock signal 124, this delay amounts to the time that would be consumed by 4 cycles of the normal higher frequency function clock signal 124. A similar situation exists in row 560, with respect to the delay 3 instruction, except that in this circumstance the execution of instruction B is delayed by 3 cycles of the selected source clock signal 122 and 6 cycles of the normal higher frequency function clock signal 124.

Rows 562, 564, 566 and 568 correspond to the effects described in rows 554, 556, 558 and 560, respectively, except that the one edge signal 250 is asserted. Asserting the one edge signal 250 (FIG. 4) causes the frequency of the function clock signal 124 to equal the frequency of the selected source clock signal 122, with aligned edges between these signals. The assertion of the one edge signal 250 is used for applications of the programmable interface where the alternate edge of the selected source clock signal 122 is never required, as is the case for very simple serial protocols. With these equal frequency signals, the execution of the NOP instruction in row 562 consumes one cycle of both the function clock signal 124 and the selected source clock signal 122. The execution of the delay 1 instruction, shown in row 564, delays the execution of instruction B for 1 cycle of the function clock signal 124 and the bit cell counting signal. The execution of a delay 2 and a delay 3 instruction, shown in rows 566 and 568, delays the execution of instruction B for two complete cycles and three complete cycles of the function clock signal, respectively. Because the function clock signal 124 has the frequency of the selected source clock signal 122 and the delay instruction is measured with respect to complete cycles of the bit cell counting signal, the odd delay of an additional cycle of the function clock signal 124 does not result in the examples shown in rows 566 and 568 as compared to the examples shown in rows 558 and 560.

Figure 15:
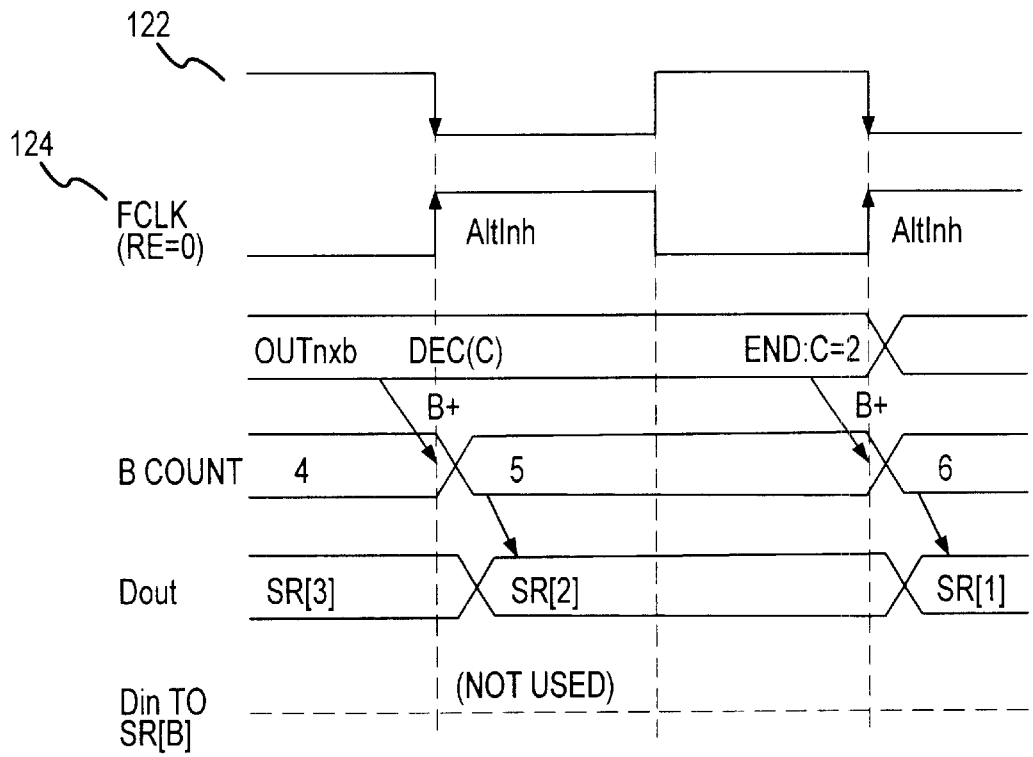
FIGS. 15, 16, 17, 18, 19 and 20 are each a collection of waveform diagrams which are coordinated in time relationship to one another and to a bit cell counting signal and a function clock signal which illustrate the functionality of the reprogrammable interface in response to executing the OUTnxb and INbnx instructions shown in FIG. 14.

Because of the high efficiency in I/O transfers achieved by the other instructions used in their reprogrammable interface 100, the delay and NOP instructions 550 are not frequently used. However, when they are used, the delay 1, delay 2 and delay 3 instructions serve the purpose of executing the next instructions on the same type of edge, primary or secondary, of the instruction proceeding the delay. This utility is valuable in aligning other instructions for synchronization purposes. If longer delays than 3 (6 edges) are needed in a particular instance of the programmable interface, the C-field of the delay instruction (FIG. 12) could be widened to 3 bits as is shown for the OUTnxb and INbnx instructions (FIG. 15). The NOP instruction causes the next instruction to execute at the opposite type of edge. The other improvement from the delay 1, delay 2 and delay 3 instructions is that it is not necessary to execute a separate instruction for each function clock cycle when delays of multiple function clock cycles are required. Consequently, the instructions remain idle during the time period of the multiple function clock cycles and power is not consumed in executing any instructions during those function clock cycles.

A wait instruction 590 is illustrated in FIG. 13. The wait instruction 590 postpones completion of execution of the instruction following the wait instruction, until the first primary clock edge on which the specified event is asserted. Typical events include loading of the address or data output registers 480, 482 and 484 (FIG. 10) from the internal bus 106, reading the data input registers 486 and 488 to the internal bus 106, assertion discrete control inputs from external device, or expiration of a predefined time interval.

If the event is asserted when the wait instruction is executed, the next instruction is executed without delay. The wait instruction has the property of always resuming execution on a primary edge. This is useful because an instruction sequence following the wait has a known phase relationship with the polarity of the selected source clock signal 122.

An important improvement available from the present invention is the ability to perform certain instructions, primarily multibit I/O transfers, by repeated sequential application of a single instruction over a predetermined number of bit cells. An OUTbnx instruction and an INnxb instruction are respectively used to transfer out each next bit in a series and to transfer in each next bit in a series, by fetching a single instruction and repeating its execution multiple times to transfer for up to seven bits in the series. The OUTnxb and INbnx instructions 600 are similar, as shown in FIG. 14, with the bit in a field 602 distinguishing the two instructions.

The OUTnxb and INbnx instructions 600 allow up to seven sequential bits to be shifted from and/or to the serialization register 506 (FIG. 10) without requiring a multi-instruction loop. The repeat functionality of the instructions 600 is based on the value in a three bit repeat field 604. Repetition counts of 2–7, but not 8, are provided because, because within eight bit serialization register 506 (FIG. 10), it is generally necessary to handle at least one of the first or the last bits of each eight-bit byte differently from the other seven bits of the byte.

A value of 1 in the repeat field 604 transfers a single bit in and/or a single bit out, and asserts the alternate inhibit signal 248/126 to the function clock generator 240. This causes instruction execution to consume a full cycle of the selected source clock signal 122. By skipping the alternate clock edge, the execution of the instructions remain aligned on the same edge of the selected source clock signal 122 (clocking and signal 232) at the end of this instruction. The bit counter 514 (FIG. 10) selects the bit position within the serialization register 506, and is incremented by one during each repetition of this instruction.

Count values greater than 1transfer or count sequential bits to and/or from the serialization register 506 in a selected order. The count values 2–7 as coded in the repeat field 604 and are loaded into the repeat counter (C) to perform the repetition. The bit counter 514 selects the starting bit position within the serialization register 506, and is incremented by one for each each bit of repetition. These instructions execute in full bit cell cycles, as is discussed above. Each bit is input and/or output at the same edge, on successive cycles of the selected source clock signal 122, as the first edge used by the current instruction. The repeat counter 532 (FIG. 10) is used to count these repetition clock cycles.

Both the OUTnxb and the INnxb instructions increment bit counter 514 on each of their repeated execution. For the output function obtained by executing the OUTnxb instruction, the effect of incrementing the bit counter 514 is to cause the next sequential bit to appear at 496 (FIG. 10). For the input function obtained by executing the INnbx instruction, the effect of the data in signal at 502 is sampled in parallel with incrementing the bit counter 514, so the input function stores the sample data in the present bit position and increments so the next input signal will occur to the next incremental bit position.

The use of an OUTnxb instruction to shift out data during half duplex communication is illustrated in FIG. 15, relative to the cycles of the bit cell counting signal 122 and the function clock signal 124. The OUTnxb instruction has incremented the bit counter (B) 514 at the execution clock edge, causing the data out (Dout) signal 496 to change because the data output multiplexer 490 selects a different bit from the serialization register 506 (FIG. 10). Each incrementing value of the bit counter (B count) causes another bit from the serialization register (SR) to be shifted out. One bit is shifted out on each cycle of the selected source clock signal 122, as a result of asserting the alternate inhibit signal to cause the function clock signal 124 to oscillate at the frequency of the selected source clock signal 122.

Figure 16:
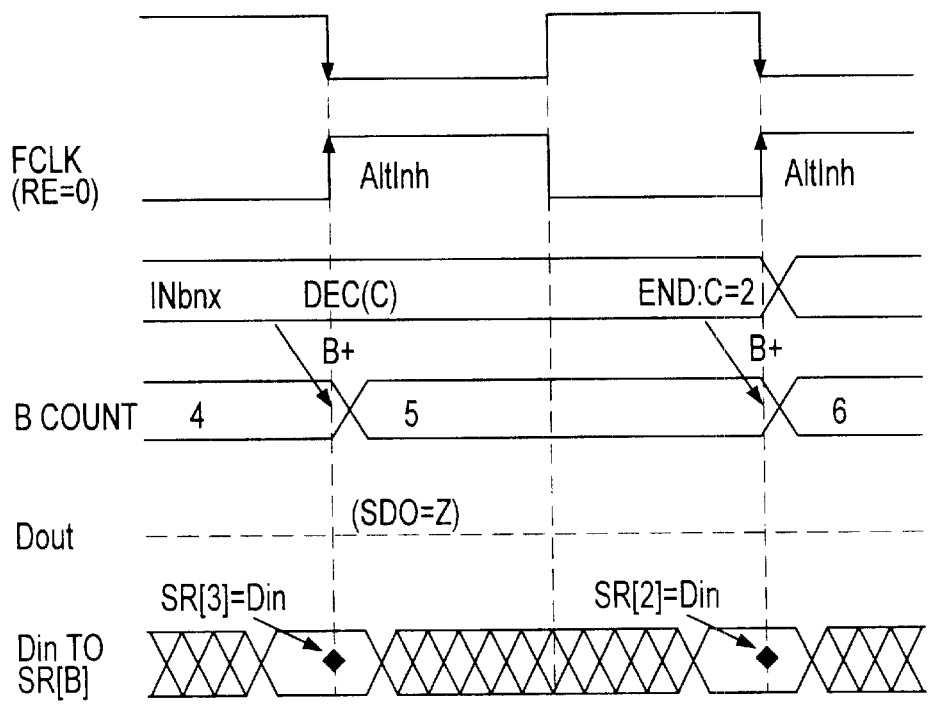

Similar functionality for executing the INbnx instruction to shift in serial data is illustrated in FIG. 16, except that the post increment aspect of the instruction is illustrated. The serialization register (SR) is clocked to update the one bit location selected by the bit counter (B) via the merge logic 520 (FIG. 10).

In both of the examples illustrated in FIGS. 15 and 16, the big endian enable control signal 538 (FIG. 10) is asserted to cause the selected bit in the serialization register to count down as the value of the bit counter 514 (B count) counts up. Also, because only data input or data output are relevant at any particular time during half duplex communications, the output latch 492 (FIG. 10) is not used (remains transparent) during such transfers.

Figure 17:
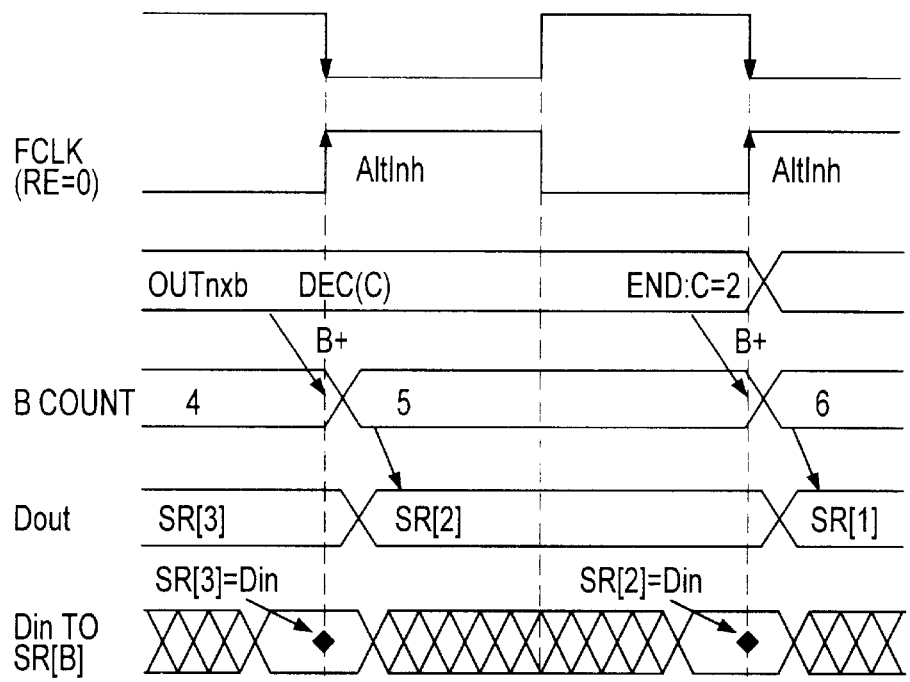
Figure 18:
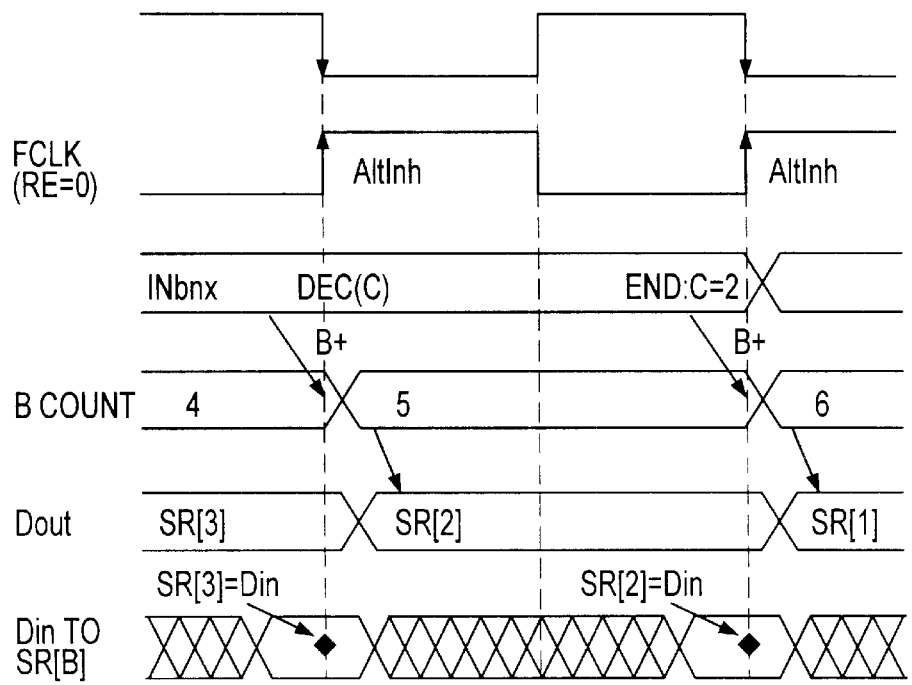

FIGS. 17 and 18 illustrate the execution of an OUTnxb and INbnx instruction, respectively, under conditions of full duplex in and out. Where a consecutive edge of the selected source clock signal 122 is used for both input and output. The I/O functions for the OUTnxb and the INbnx instructions are identical. The functionality achieved by the OUTnxb and INbnx instructions shown in FIGS. 17 and 18 is also identical to the combined functionality discussed in conjunction with the half duplex examples shown in FIGS. 15 and 16. The bit counter 514 (FIG. 10) is incremented on the same clock edge that the input bit is stored to the pre-incremented bit position in the serialization register (SR) 506. Consequently the latch 492 (FIG. 10) remains transparent during these full duplex transfers. In the execution of the instructions OUTnxb and INbnx shown in FIGS. 17 and 18, the bit counter 514 (B count) is incremented on the same edge that the data is sampled.

Figure 19:
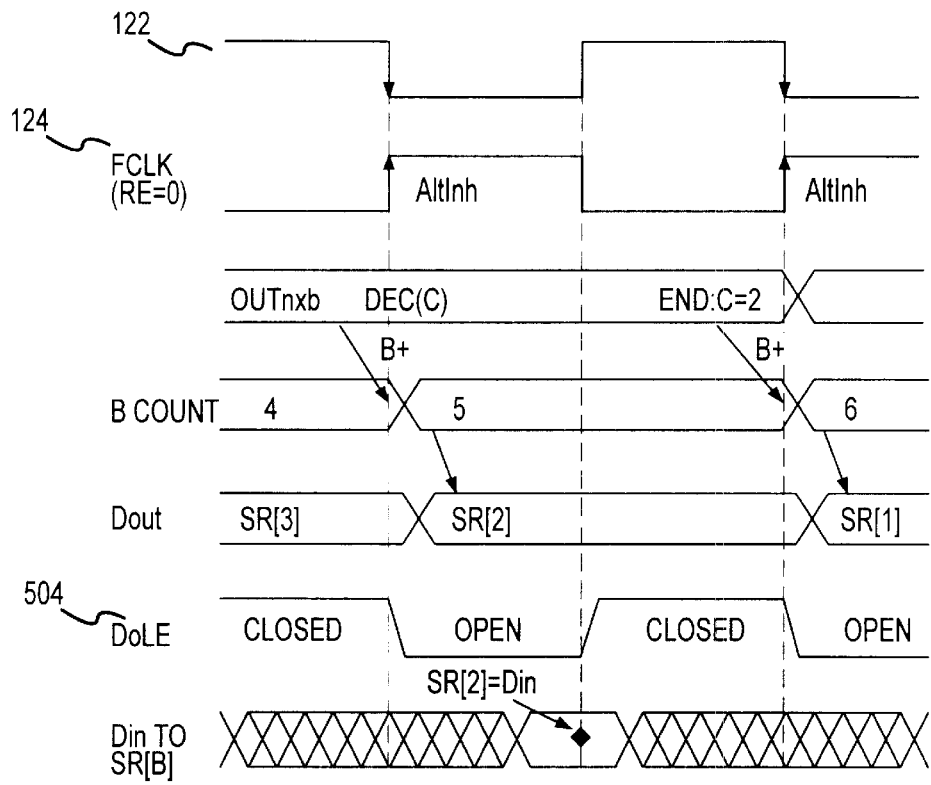
Figure 20:
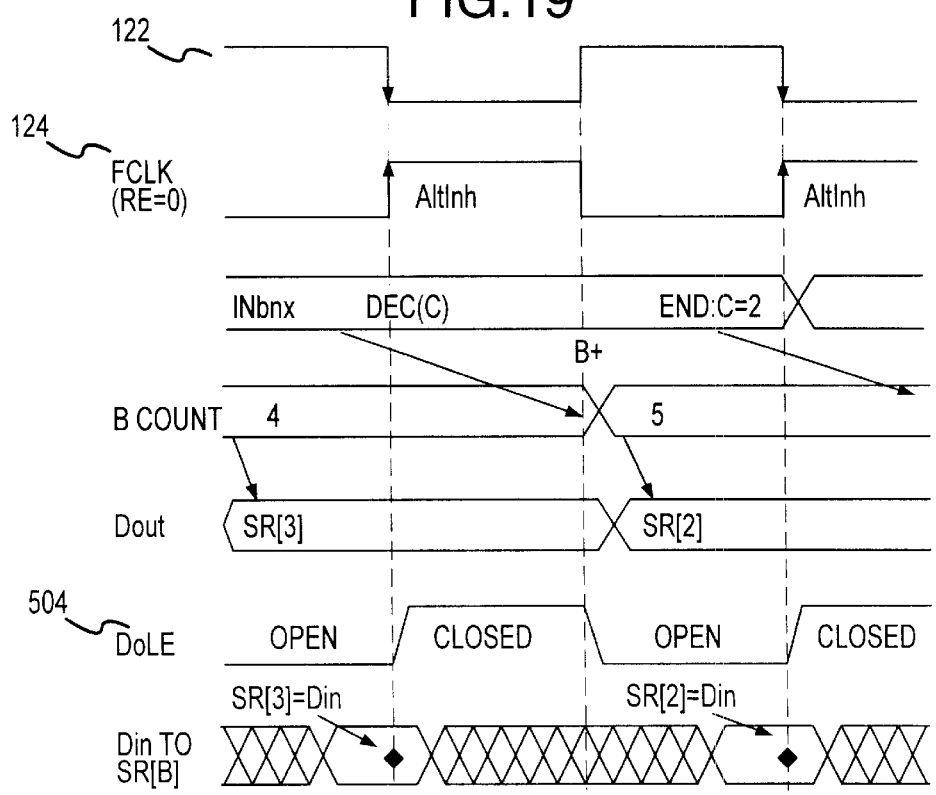

FIGS. 19 and 20 respectively illustrate the execution of the OUTnxb and INbnx instructions under full duplex conditions when opposite clock edges are used for shift-out and shift-in. This effect is the so-called split clocking. In the case illustrated in FIG. 19, on the first execution edge, the bit counter (B count) is incremented and the data out is selected or updated. The input data is sampled at the following opposite edge. The successive bits in the serialization register 506 are output and input on the same respective clock edges of sequential bits cells until all relevant bits of the serialization register have been processed. The situation shown in FIG. 20 is except that the input sampling occurs at the first of the clock transition and the output updates at the second clock transition. In that case, the data is first sampled at the execution edge of the function clock signal and the data out is transmitted at the next following opposite edge.

When split clocking is enabled, the latch 492 (FIG. 10) is always closed for one-half of a bit cell starting at the same clock edge which is used to sample the input data. Opening and closing the latch 492 is accomplished by negating and asserting, respectively, the data out latch enable signal (DoLE) 504. Closing the latch 492 (FIG. 10) under these conditions prevents the captured input data in the serialization register 506 from feeding through to the data out during sampling phase of each cycle of the selected source clock signal 122. For executing OUTnxb instructions, the latch 492 must be closed during the second-half of each cycle, starting at the alternate edge. For INbnx instructions, the output latch must be closed during the first half of each cycle, starting at the execution edge.

Because the functions executed by these two instructions are symmetric with respect to the selected source clock signal 122, either instruction can be used for any split clock, full duplex transfer. The selection of which instruction to use for any given transfer sequences is based on the need to match the available clock edges to asymmetric handling of byte boundaries. Usually the INbnx instruction is used if the sequence begins with an input edge, and the OUTnxb instruction is used if the sequence begins with an output edge.

Figure 21:
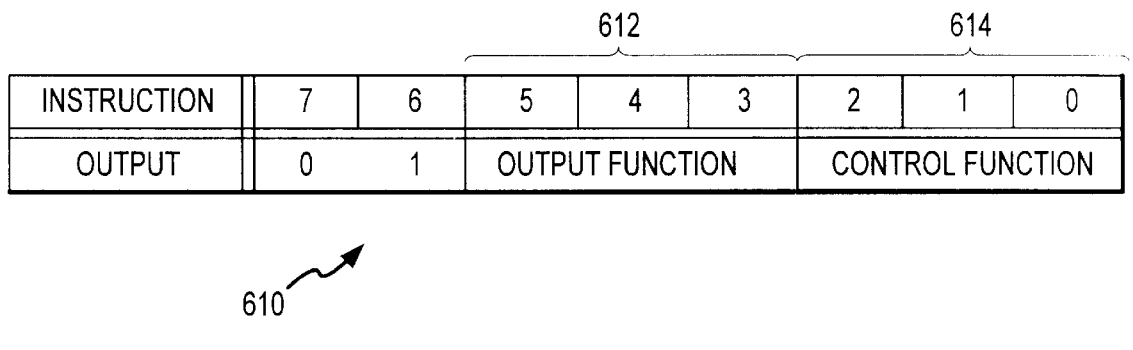
FIG. 21 is a graphical illustration of the bit fields of an output control instruction recorded in an instruction store of the reprogrammable interface shown in FIG. 3.

An output control (OutCtl) instruction 610 is shown in FIG. 21. The output control instruction 610 can perform input and/or output on a single bit to and from the serialization register 506 (FIG. 10) while simultaneously performing a control function. The field 612 of the instruction 610 is used to code the output function. The field 614 is used to code the control function. It is possible to hold the output function while changing the control function, or change the control function while holding the output function. The output functions are outputting of a 0, outputting of a 1, disabling the output during half duplex communications to set up for input, a single bit of in function, a single bit of out function, and a hold which does no output function while performing a control function. The control functions include a null for just performing an output function, a skip next which asserts the alternate inhibit functionality, and a variety of functions each of which set a particular state for discrete control output and/or data and clock enable signals associated with the interface 100.

With the reduced set of instructions described above, and the use of the reprogrammable interface 100, including the dual edge function clock generator 240, it is possible to perform an extensive number of I/O operations and functions with relative efficiency and decreased power consumption.

Figure 22:
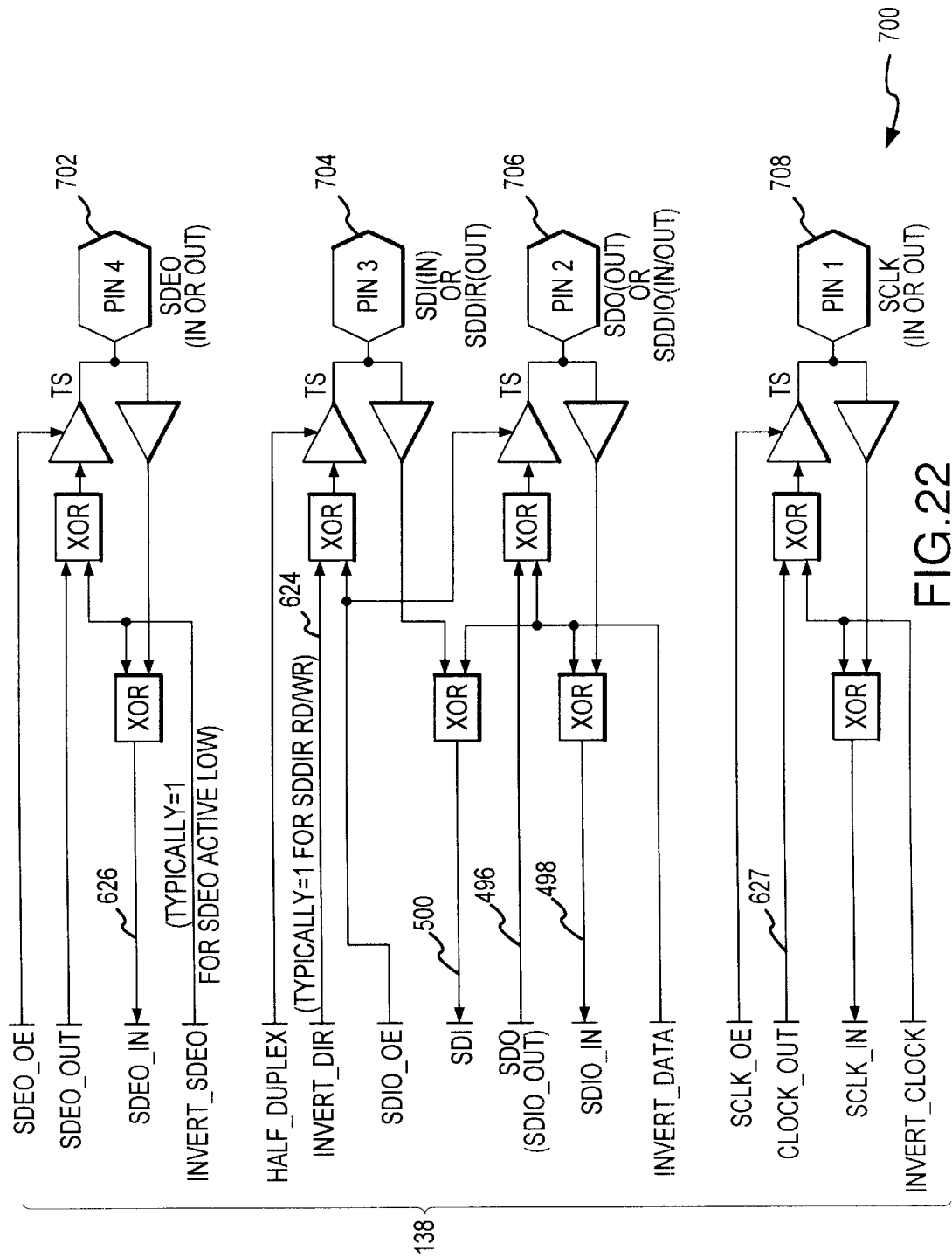
FIG. 22 is a logic diagram of a typical off-chip transceiver and receiver circuit which is connected to the reprogrammable interface shown in FIG. 3, in order to transmit and receive signals over many types of common, short haul serial peripheral interface buses.
Figure 24:
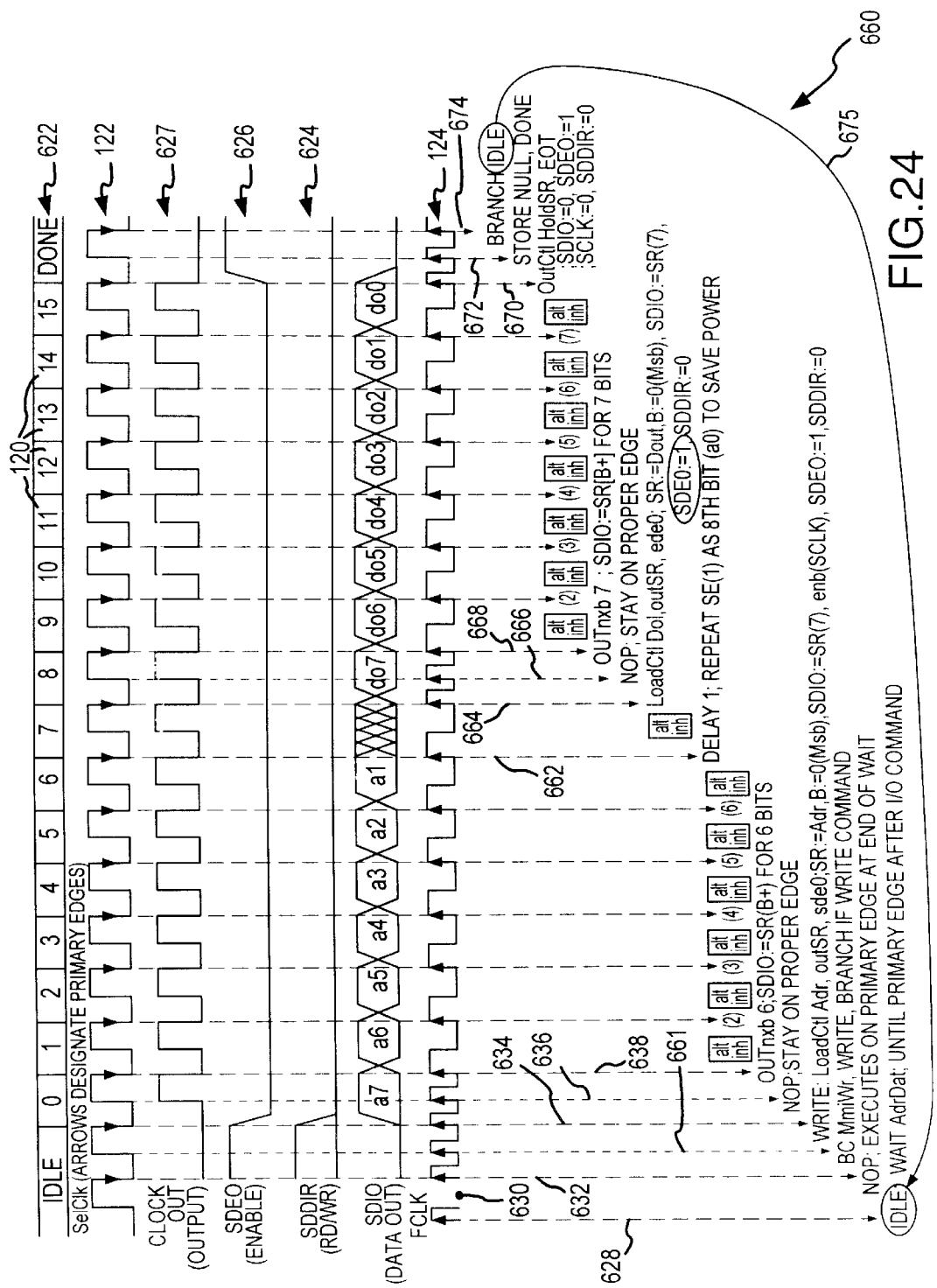
FIG. 24 is a collection of waveform diagrams which are coordinated in time relationship to one another, to a series of bit cells, the selected source clock signal, to the function clock signal, and to control and data signals from the transceiver circuit shown in FIG. 22, illustrating a exemplary read operation performed by the reprogrammable interface shown in FIG. 3 using combinations of the instructions shown in FIGS. 11, 13, 14 and 21.

Examples of the manner in which these instructions can be used efficiently in performing a read and write transactions over a typical short haul serial peripheral interface protocol bus are shown in FIGS. 24 and 25. When used in such an application, the reprogrammable interface 100 is connected to an additional transceiver circuit 700 which supplies and receives the input and output signals, as shown in FIG. 22. The I/O control signals 138 from the internal I/O logic interface 136 (FIG. 3) are supplied to and received from the transceiver circuit 700. Each signal connection to each pin 702–708 includes XOR gates on both the output signal to the driver and input signal from the receiver to permit programmable inversion of the external signals relative to the on-chip signals on a pin-by-pin basis. As shown in FIG. 22, pins 702, 704, 706 and 708 are connected to the transceivers and drivers. The output signals are supplied from these pins to external conductors (not shown) after the signals have been amplified by the driver portions of the transceivers. Similarly, the input signals are received at these pins. The pins are typically output connectors of the semiconductor package in which the interface 100 and the other associated components of the system chip 102 (FIG. 1) are packaged.

It is common that both serial data and control signals are supplied on separate conductors of such short haul serial peripheral interface buses. The transceiver circuit 700 supplies a serial data enable signal (SDE0) 626 from pin 702. The serial data enable signal 626 is present as a control signal during times of communication of serial data. In essence, the serial data enable signal 626 is communicated from the interface initiating a serial transfer to enable a particular other device attached to the bus. While only SDE0 is illustrated, additional enable signals could be provided if necessary. Pins 704 and 706 are interconnected data receivers and devices. Serial data input signals (SDI) 500 (FIG. 10) are received at pin 704 during full duplex operations. A serial data direction control output signal (SDDIR) 624 is also supplied from pin 704 during half duplex operation. The two logic levels of the serial data direction control signal 624 represent, on a control signal, whether the data is supplied to or received from the receiver on the half duplex data signal at pin 706. Pin 706 includes a transmitter for supplying serial data out signals (SDO) 496 during full or half duplex communication and a receiver for the input during half duplex transfers, known as serial data in/out (SDIO) signals 496 and 498 (FIG. 10). Lastly, a clock out signal 627 is present at pin 708 during the sequence of those bits cells during which serial data takes place. The clock out signal 627 may be used to synchronize to the receipt of the digital bit signals which form the data. Pin 708 can also be used as the clock in signal (CLKin) 134 (FIG. 3) when the data clock is supplied by the existing interface.

Figure 23:
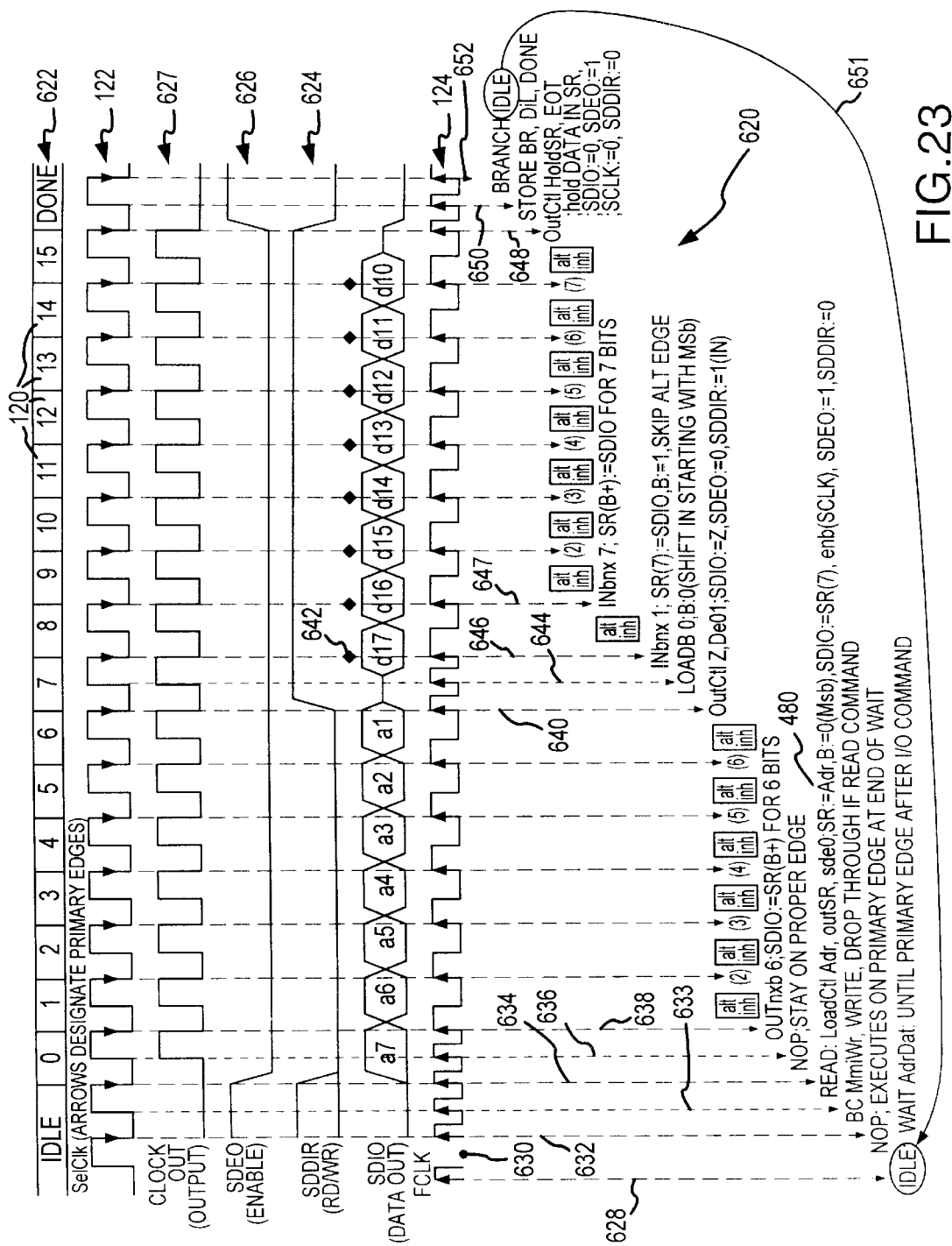
FIG. 23 is a collection of waveform diagrams which are coordinated in time relationship to one another, to a series of bit cells, to the selected source clock, to the function clock signal, and to control and data signals from the transceiver circuit shown in FIG. 22, illustrating an exemplary write operation performed by the reprogrammable interface shown in FIG. 3 using combinations of the instructions shown in FIGS. 11, 13, 14 and 21.

In FIGS. 23 and 24, which respectively illustrate a read I/O operation 620 and a right I/O operation 660, the waveforms in wider lines represents signals are communicated externally of the reprogrammable interface 100 as serial data signals or as control signals. The waveform shown in narrower lines illustrate signals which are internal within the reprogrammable interface 100.

A read I/O operation 620 is illustrated in FIG. 23. The read I/O operation 620 is performed during a sequence of 16 sequential bit cells 120, each of which has been numbered in a row 622. The selected source clock signal 122 defines the boundaries of each of the bit cells. The selected source clock signal 122 has its falling edges designated as the primary edges, as shown. The function clock signal 124 is shown in relation to the selected source clock signal 122.

The read operation 620 involves supplying an address of a location, typically a register or a memory byte from which the data is to be read and made available to the internal bus 106 through the register 488. After supplying the address, the destination device from which the data is read supplies or transmits the data back to the interface 100. The interface 100 thereafter clocks or samples that data and transfers it for use by the other components of the system chip 102 (FIG. 1). Thus, a read operation 620 involves a transmission of address bit signals which defines a seven bit address, followed by a one bit period for half duplex turnaround, followed by reception of data bit signals which returns an eight-bit data value. A serial data direction control signal (SDDIR) 624 assumes a logic low level during the time that the half duplex SDIO signal is being driven from the programmable interface, and a logic high level during times when the SDIO signal is treated as input to interface 100. The serial data enable signal 626 is asserted as a logic low level to enable the external peripheral device during each transaction, and is negated at other times.

Since the interface transmits and receives bit signals in a serial manner, the interface must decompose multibit address signals into individual bit signals and transmit those bit signals individually and in sequential order. The recipient of the communication must recognize each of the individual bit signals and assemble those bit signals into the multibit values. Similarly, the transmission of data occurs by the transmission of sequential bit signals in a predetermined order. The data is serialized from multibit data words into the individual bit signals, transmitted as a sequence of the individual bit signals, and is deserialized by the recipient into the multibit data words.

The address signals constitute the bit signals which are designated a7, a6, a5, a4, a3, a2 and a1, and those bit signals are transferred out during the bit cells numbered 0 to 6, respectively, during the read operation 620. The data read into the interface in the case illustrated in FIG. 23, consists of a byte defined by 8 bit signals di7, di6, di5, di4, di3, di2, di1 and di0, which are received by the interface during the bit cells numbered 8 through 15. Bit cell number seven is provided for half duplex turnaround SDIO. The values of the data in bit signals are sampled or read by the interface at the beginning of the boundaries of the bit cells numbered 8 to 15.

For illustration purposes in FIG. 23, the read operation 620 commences at the time reference 628 with the execution of a wait instruction (590, FIG. 13). The wait instruction is executed to suspend operation of the programmable interface while waiting for the address register to be written by the embedded processor 104 (FIG. 1). As a result an arbitrary length delay reference 630 occurs. As discussed, the wait instruction postpones the execution of the next following instruction until the first primary edge of the selected source clock signal 122, which is shown as occurring at time reference 632. In this case, the condition is the loading of the address register 480 (FIG. 10) from the internal bus 106 by the embedded processor 104 (FIG. 1). This occurs allowing execution to resume on the primary edge of the selected source clock signal 122. Execution of the wait instruction aligns the following sequences of instructions to the primary edge of a selected source clock signal 122, and thereby permits the instructions to be executed in a known manner relative to the selected source clock signal 122. A NOP instruction (550, FIG. 11) is executed at the rising edge occurring at time reference 632. The NOP instruction extends over one cycle of the selected source clock signal 122. Following the NOP instruction is a conditional branch instruction that selects between performing a read operation and a write operation based on which was requested by the embedded processor. The conditional branch instruction drops through to the next instruction because it was requested with a read instruction.

At the primary edge of the selected source clock signal 122 at time reference 634, which defines the beginning boundary of the bit cell numbered 0, the I/O read sequence begins by executing a load control instruction. The load control instruction transfers the address from the address register 480 (FIG. 10) to the serialization register 506, while simultaneously resetting the bit counter 514 to zero, enabling the delivery of the selected source clock signal 122 as the clock out signal 627, and asserting the serial data enable signal 626 and the serial data direction signal 624 for the write operation. The big endian control signal 538 (FIG. 10) has been set during initialization of the programmable interface to cause all transfers of data in this protocols to occur on the basis of the most significant bit first. Resetting the bit counter to zero causes the output selection multiplexer 508 to select the bit seven from the serialization register, which is address bit seven, to be transmitted as the SDDIR signal 624 as shown. Based on preconfigured I/O signal usage settings in modal state registers, the clock out signal 627 is enabled to provide timing reference to the external peripheral device.

As a result of the functions achieved by the read instruction executed at time reference 634, the address bit signal a7 propagates from the serialization register as SDIO output for the bit cell numbered 0. Because the load control instruction executed in time 634 occurs on the first cycle of the function clock signal in the bit cell numbered 0, and the load control instruction has no provision to perform an alternate inhibit function, a NOP instruction is executed at time reference 636 to fill the second half of the bit cell numbered 0.

Beginning at time reference 638 with the primary edge of the bit cell numbered 1, an OUTnxb instruction (600, FIG. 14) is executed with a repeat count of six to cause the OUTnxb instruction to be repeatedly executed in the six sequential bit cells numbered 1 to 6. Of course, during execution of the OUTnxb instruction, the alternate inhibit signal is asserted to the function clock generator 240 (FIG. 5), which causes the function clock signal 124 to supply one cycle during each bit cell period, at the same frequency as the selected source clock signal 122. As a result, the address bits a6, a5, a4, a3, a2 and a1 are sequentially supplied during each sequentially occurring bit cell numbered 1 to 6, respectively. By the occurrence of the bit cell numbered 7, all of the address bits have been supplied.

When the OUTnxb instruction ends at the beginning of bit cell numbered 7, the function clock signal 124 resumes its normal, uninhibited frequency of executing two cycles during the bit cell numbered 7. During the first cycle of the function clock signal occurring in the bit cell numbered 7, at time reference 640, an output control instruction is executed to disable the output driver of the SDIO signal path and to set the SDDIR signal 624 to the proper state for transferring in the data to be read. An output control instruction permits the simultaneous performance of an input or an output function and a control function. The output control instruction performed at time reference 640 conditions the interface 100 to receive the data bits and causes the serial data direction signal 624 to be asserted at a logic high-level, thereby readying the interface to receive the data bit signals.

During the second cycle of the function clock signal executed during the bit cell numbered 7 beginning at time reference 644, an instruction to load the bit counter is executed. The load instruction sets the bit counter 514 (FIG. 10) to zero to cause input in conjunction with the big endian control signal 538 asserted, the data input to began at bit 7.

Beginning with the bit cell numbered 8 at time reference 646, the first of two INbnx instructions (600, FIG. 14) commences execution. The first INbnx instruction is executed at time reference 646, and the second INbnx instruction is executed at time reference 647. The first INbnx instruction is executed to input a bit signal into bit cell numbered 7, skipping the alternate edge. This inputs a single bit signal which is sampled at 642 into the bit cell numbered 7. The second INbnx instruction is executed at time reference 647 and repeats seven times at the beginning of the bit cells numbered 9 through 15 to sample the remaining seven bit signals di6 to di0. The values of these data input bit signals are sampled at the time references shown by the black diamonds at the ends of the bit cells numbered 9 to 15. Sampling is performed by clocking these values through the merge logic 520 (FIG. 10) to the serialization register.

At the time reference 648 at the end of the bit cell numbered 15, the function clock signal again resumes its normal frequency of two cycles per bit cell. In addition, on the first cycle of the function clock signal 124, an output control instruction is executed. This output control instruction holds the data which has been clocked into the serialization register 506, while turning off the control signals by negating the serial data enable signal 626, allowing the serial data direction control signals 624 to go low, and disabling the clock out signal 627. On the second cycle of the function clock signal executed in the bit cell following the bit cell numbered 15 at the time reference 650, a store instruction is executed which transfers the data from the serialization register into the low order byte register 488 (FIG. 10), so that data may be thereafter read out over the bus 106. The store instruction also causes the interface 100 to inform the embedded processor 104 that the data is available by asserting a read event as a control signal 116 (FIG. 1) to interrupt or otherwise inform the embedded processor that this data is available. Thereafter at time reference 652, the sequence is completed and unconditional branch 651 is executed to return the flow of execution to the wait instruction at time reference 628. If the embedded processor has another read operation 620 set up, the wait instruction would be executed at 628 in a single clock period and the entire sequence 620 would begin again.

The repeated execution of the OUTnxb and INbnx instructions, as well as reducing the clock rate of the function clock signal during the time that those instructions are executed, significantly reduces the power consumed in performing the operation and enhances the efficiency of performing the read operation. Large numbers of instructions need not be fetched and executed, as would be the case in a conventional processor emulating a state machine which requires multiple instructions to be executed in a loop involving at least fetching the instruction and executing it in order to achieve one function. In the example of the read operation 620 shown in FIG. 23, only about 12 instructions are executed to supply a seven bit address signal and to receive an eight-bit data byte. A comparable operation in a conventional state machine would require in the neighborhood of 50 to 70 or more instructions to be executed. Reducing the number of instructions executed increases the speed at which it is possible to perform the I/O operations or reduce the clock rate which is needed to perform I/O at the same speed. Furthermore, during the execution of these instructions, the function clock operates at a diminished frequency, thereby consuming significantly less power than would otherwise be the case if its frequency remained undiminished.

Similar benefits and functionality are also available during the performance of the write operation 660 shown in FIG. 24. A write operation involves transmitting or supplying the address signal of a location at which data signals are to be written, followed by transmitting the data signals themselves. In this regard, the write operation 660 involves similar addressing functionality as the read operation 620 which has been previously described in conjunction with FIG. 23. Consequently, many of the reference numerals used in FIG. 23 have also been used in FIG. 24 to describe common reference points, events and items.

The write operation 660 shown in FIG. 24 is also shown as beginning with the wait function as describe previously. The functionality of the write operation during the addressing portion is similar to the functionality previously described in conjunction with the read operation 620 described in FIG. 23, with the exception that the branch on condition instruction is executed at time reference 661 which causes a branch to a write sequence at the time reference 634. From the time reference 634, the write sequence performs the identical functionality as has been previously described in connection with the read operation 620 (FIG. 23) up through bit cell numbered 6.

At the time reference 662 at the beginning of the bit cell numbered 7, a delay 1 instruction (550, FIG. 11) is executed. The delay 1 instruction asserts the alternate inhibit signal, thereby causing the function clock generator to produce one cycle during the bit cell numbered 7. The cross hatching shown at SDIO means that the bit signal during a bit cell numbered 7 is irrelevant, because its value has previously been sampled in the bit cell numbered 6. The value is left in place on the bus during the bit cell numbered 7 to save power by not executing an instruction during that bit cell. No recipient is sampling data during this bit cell numbered 7.

Beginning with the bit cell numbered 8 at time reference to 664, the function clock signal 124 resumes its normal frequency of two cycles per bit cell. During the first cycle of the function clock signal occurring during the bit cell numbered 8, a load control instruction is executed. The load control instruction causes the data from the low order data out register 484 (FIG. 10) to be to be loaded into the serialization register 506 and to reset the bit counter 514 to 0. The load control instruction leaves the serial data enable signal 626 and the serial data direction signal 624 in their low states. The big endian control signal 538 removes set to deliver out first the most significant bit (bit do7) on the SDIO output signal.

During the second cycle of the function clock signal in the bit cell numbered 8, which began set time reference 666, a NOP instruction is executed. The output load control function does not have the method of specifying the alternate inhibit functionality, so executing the NOP instruction at this time maintains the proper time reference for executing instructions in sequence.

At time reference 668 at the beginning of the bit cell numbered 9, the OUTnxb instruction (600, FIG. 14) is executed with a repeat value of 7 to cause bits do6 through do0 to be supplied at bit cells numbered 9 through 15. The alternate inhibit signal is asserted, causing the function clock signal 124 to exhibit one cycle per bit cell. The same OUTnxb instruction is thereafter repeatedly executed six more times, thereby completing the transmission of the eight-bit data byte at the end of the bit cell numbered 15 at time reference 670.

A output control instruction is executed at the time reference 670. The output control instruction ceases any further operation of the serialization register 506 and causes the data in it to be held. In addition, the serial data direction control signal 624 is negated. The serial data enable signal 626 is allowed to go high, ending the operation by disabling the external interface (FIG. 22) at the end of transmission.

On the second cycle of the function clock signal beginning at time reference 672, a store instruction is executed. The store functionality has no effect, i.e. is null, because there is nothing to store. However, the done functionality is an event or interrupt request (signal 116, FIG. 1) to the embedded processor to indicate the completion of the write transfer. Thereafter at time reference 674, the sequence is completed and an unconditional branch 675 is executed to return the flow of execution to the wait instruction at time reference 628. If the embedded processor has another write operation 660 set up, the wait instruction would be executed at 628 in a single clock period and the entire sequence 660 would begin again.

The described examples of the write operation and the read operation, as well as the improved functionality of the dual edge function clock generator and from the data path section of the interface illustrate its advantages. Very few instructions are required to perform relatively powerful I/O functions. The I/O functions are therefore very effectively and economically achieved, using a few instructions of a relatively short number of bits. Consequently, the instruction store may be made small to facilitate the incorporation of the interface within the system chip. The ability to execute certain widely used I/O function instructions for a repeated number of times at an execution rate which is comparable to be serial bit signal communication rate reduces the consumption of power. The elements of the data path are selected to reduce propagation delay and to avoid consuming extra clock cycles. Many other advantages and improvements will be apparent upon gaining a full understanding and appreciation of the present invention.

A presently preferred embodiment of the present invention and many of its improvements have been described with a degree of particularity. This description is a preferred example of implementing the invention, and is not necessarily intended to limit the scope of the invention. The scope of the invention is defined by the following claims.

What is claimed is:

1. A function clock generator for generating a function clock signal used to clock the execution of instructions by an instruction decoder in a serial peripheral interface based on a source clock signal having one cycle per bit signal transmitted or received by the interface, comprising:
   a logic gate circuit connected to receive the source clock signal and a delayed copy of the source clock signal, the logic gate circuit logically gating the source clock signal with a the delayed copy of the source clock signal to create the function clock signal; and
   a delay circuit connected to receive the function clock signal and responsive to edges of the function clock signal gated by the logic gate circuit to create the delayed copy of the source clock signal;
   wherein the logic gate circuit implements XOR logic functionality with respect to the source clock signal and the delayed copy of the of the source clock signal; and
   wherein a plurality of NAND rates is operatively connected to implement the XOR logic functionality, the source clock signal and the delayed copy of the source clock signal being applied to at least one of the NAND gates.

2. A function clock generator as defined in claim 1 wherein the source clock signal has rising and falling edges, and wherein:
   the logic gate circuit creates one cycle of the function clock signal for each edge of the source clock signal.

3. A function clock generator as defined in claim 2 wherein the frequency of the function clock signal is twice the frequency of the source clock signal.

4. A function clock generator as defined in claim 2 wherein each cycle of the function clock signal has a positive phase and a negative phase, and one of the phases of the function clock signal is established by time delayed propagation of the copy of the source clock signal through the through the delay circuit.

5. A function clock generator as defined in claim 4 further comprising:
   an inverter connected to the delay circuit to invert the delayed copy of the source clock signal prior to applying the delayed copy of the source clock signal to the logic gate circuit.

6. A function clock generator as defined in claim 2 wherein:
   the time delay circuit includes a flip-flop, a delay element and an inverter connected in series and a feedback path from the inverter to the flip-flop to supply a signal from the inverter to the flip-flop in a feedback configuration, and wherein:

the time delayed copy of the source clock signal is derived from an output signal from the inverter in the feedback path; and the flip-flop is clocked to change states upon each rising edge of the function clock signal.

7. A function clock generator as defined in claim 6 wherein the signal from the delay path which is clocked through the flip-flop alternates in polarity with each rising edge of the function clock signal.

8. A function clock generator as defined in claim 7 responsive to an alternate inhibit signal and further comprising:

a selective inverting logic gate connected to receive the delayed copy of the source clock signal from the inverter of the delay circuit and to receive the alternate inhibit signal, the selective inverting logic gate supplying an inverted copy of the source clock signal from the delay circuit upon the assertion of the alternate inhibit signal; and the logic gate circuit responding to the source clock signal and the inverted copy of the source clock signal from the selective inverting logic gate to transition edges of the function clock signal coincidentally with edges of the source clock signal.

9. A function clock generator as defined in claim 2 responsive to an alternate inhibit signal and further comprising:

a selective inverting logic gate connected to receive the delayed copy of the source clock signal from the delay circuit and to receive the alternate inhibit signal, the selective inverting logic gate supplying an inverted copy of the source clock signal from the delay circuit upon the assertion of the alternate inhibit signal; and the logic gate circuit responding to the source clock signal and the inverted copy of the source clock signal from the selective inverting logic gate to transition edges of the function clock signal coincidentally with edges of the source clock signal so long as the alternate inhibit signal is asserted.

10. A function clock generator as defined in claim 9 further responsive to a rising edge primary signal and further comprising:

a second selective inverting logic gate connected to receive the delayed copy of the source clock signal from the delay circuit and to receive the rising edge primary signal, the second selective inverting logic gate supplying a non-inverted copy of the source clock signal from the delay circuit upon the assertion of the alternate inhibit signal and the rising edge primary signal; and the logic gate circuit responding to the source clock signal and the non-inverted copy of the source clock signal from the second selective inverting logic gate to transition rising edge of the function clock signal coincidentally with a rising edge of the source clock signal upon the assertion of the alternate inhibit signal and the rising edge primary signal.

11. A method for generating a function clock signal used to clock the execution of instructions In a serial peripheral interface based on a source clock signal having one cycle per bit signal transmitted or received by the interface, comprising the steps of:

logically gating the source clock signal and a delayed copy of the source clock signal with NAND logic functionality to create the function clock signal; and creating the delayed copy of the source clock signal used in response to edges of the function clock signal created by the logical gating.

12. A method as defined in claim 11 wherein the source clock signal has rising and falling edges and further comprising the step of:

creating one cycle of the function clock signal for each edge of the source clock signal.

13. A method as defined in claim 12 wherein each cycle of the function clock signal has a positive phase and a negative phase, and further comprising the steps of:

establishing one of the phases of the function clock signal by time delaying a propagation of the copy of the source clock signal; and logically gating the source clock signal and the time delayed copy of the source clock signal.

14. A method as defined in claim 13 further comprising the step of:

inverting the time delayed and propagated copy of the source clock signal prior to logically clocking the source clock signal with the time delayed copy of the source clock signal.

15. A method as defined in claim 14 responsive to an alternate inhibit signal and further comprising the steps of:

selectively inverting the time delayed copy of the source clock signal; and logically clocking the source clock signal and the inverted copy of the source clock signal to transition edges of the function clock signal coincidentally with edges of the source clock signal while asserting the alternate inhibit signal.

16. A method as defined in claim 15 further responsive to a rising edge primary signal and further comprising the steps of:

selectively inverting the delayed copy of the source clock signal to create a non-inverted copy of the source clock signal from the delay circuit upon the assertion of the alternate inhibit signal and the rising edge primary signal; and logically gating the source clock signal and the non-inverted copy of the source clock signal to transition a rising edge of the function clock signal coincidentally with a rising edge of the source clock signal upon the assertion of the alternate inhibit signal and the rising edge primary signal.

17. A method as defined in claim 15 further comprising the step of:

clocking the execution of a program instruction by using the function clock signal.

* * * * *